Aug. 6, 1935.  W. G. BURNS ET AL  2,010,582
AUTOMATIC ROASTER AND COOLER
Filed June 18, 1932  10 Sheets-Sheet 2
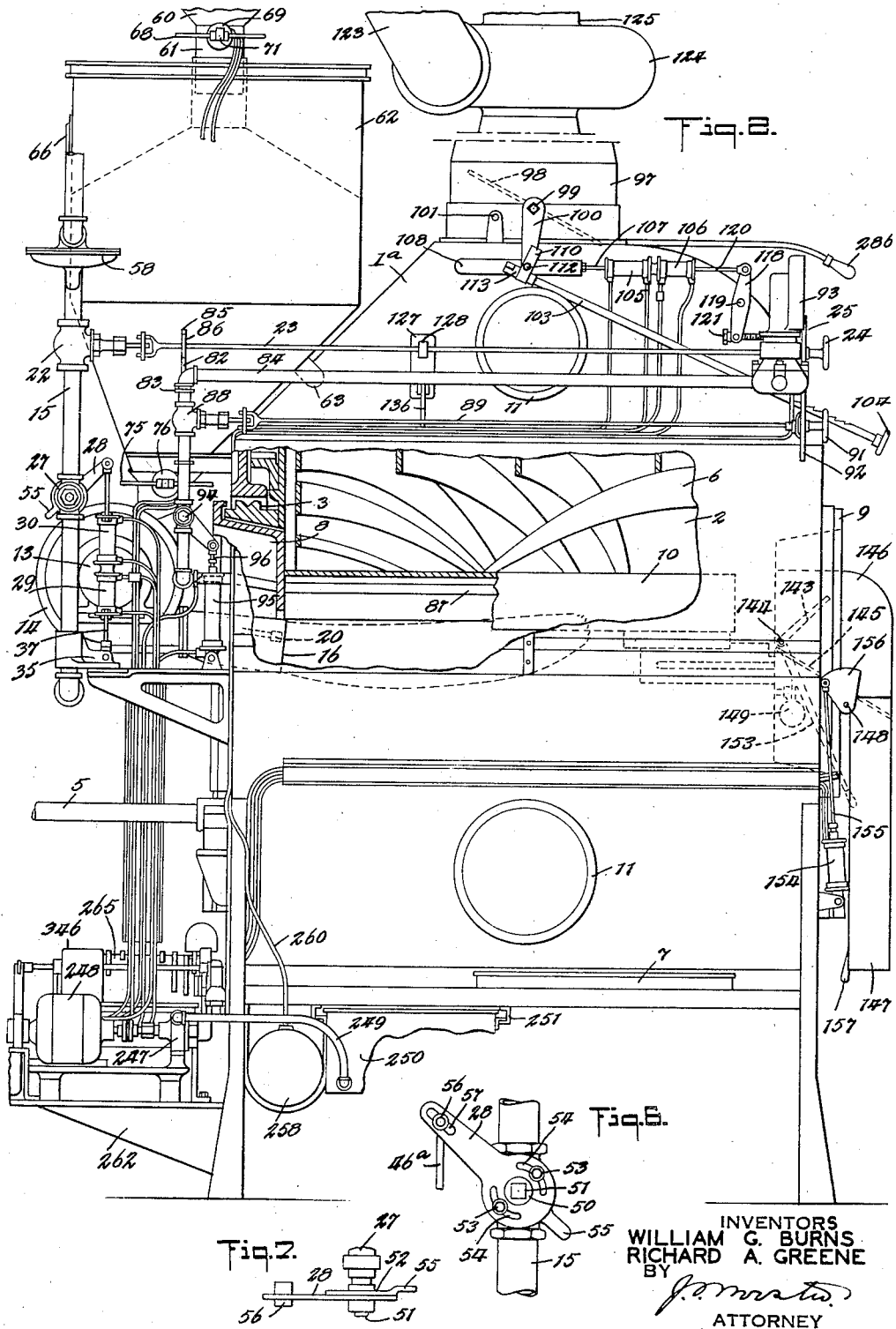
Fig.2.
Fig.8.
Fig.7.
INVENTORS
WILLIAM G. BURNS
RICHARD A. GREENE
BY
ATTORNEY

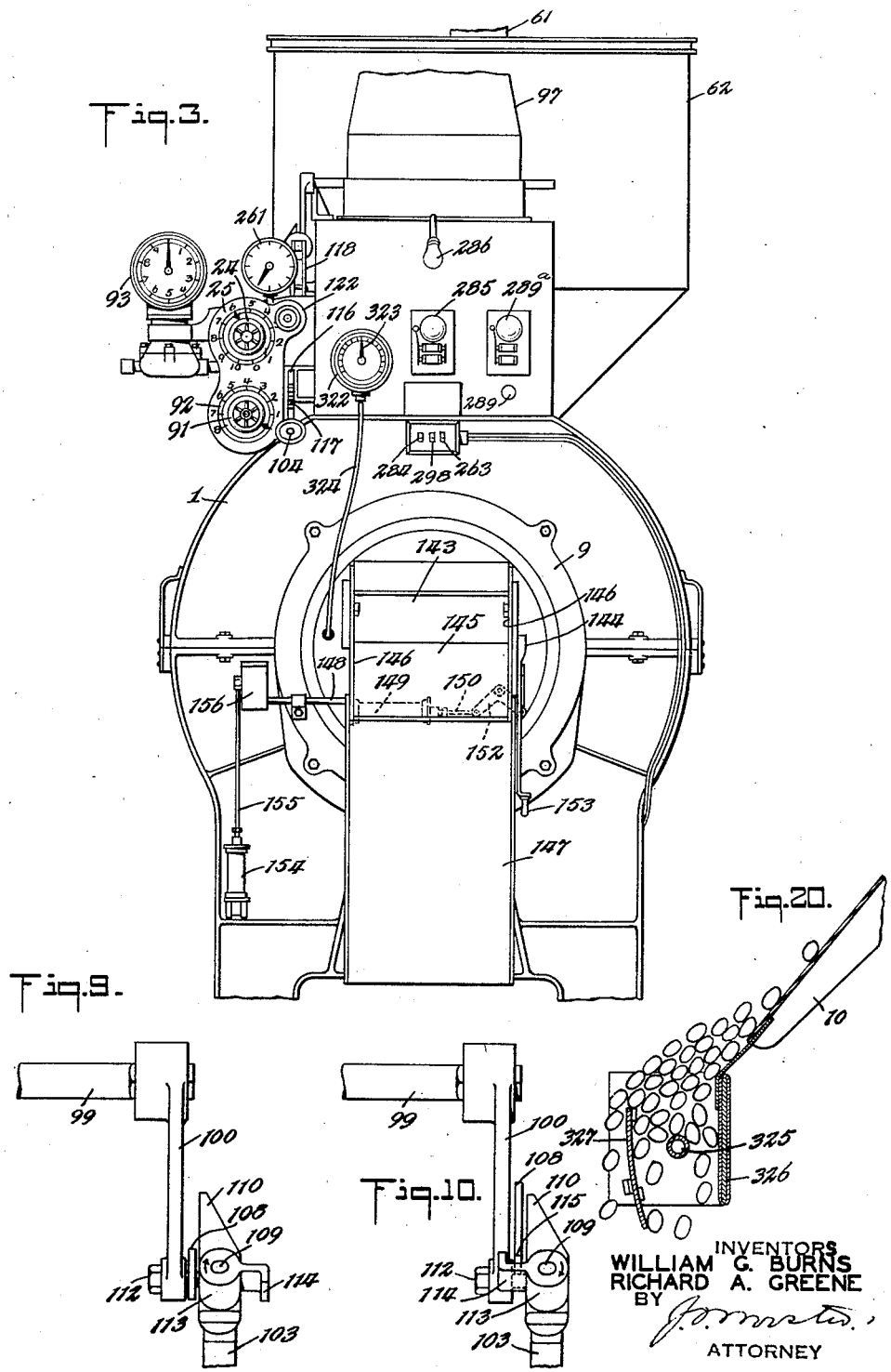

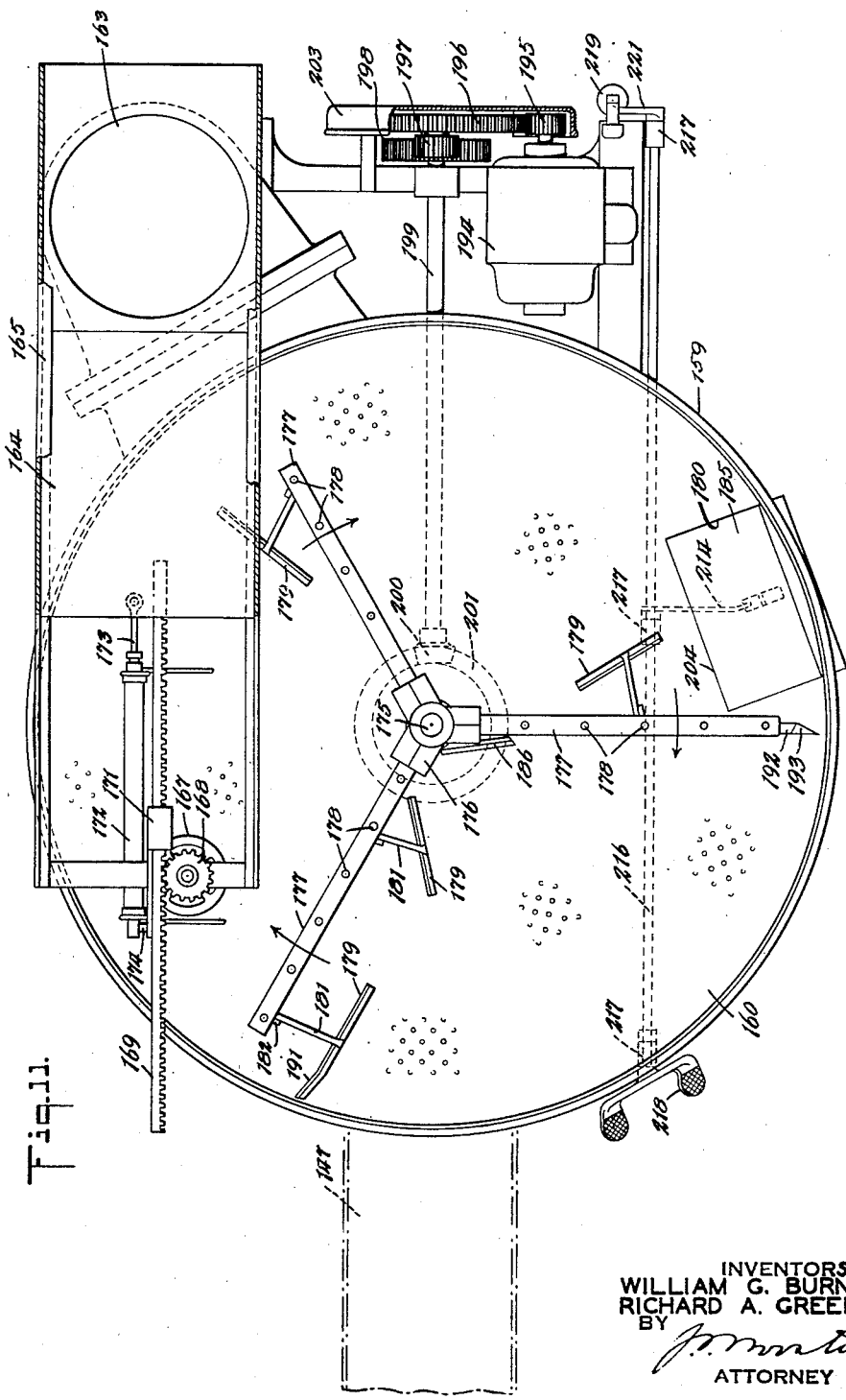

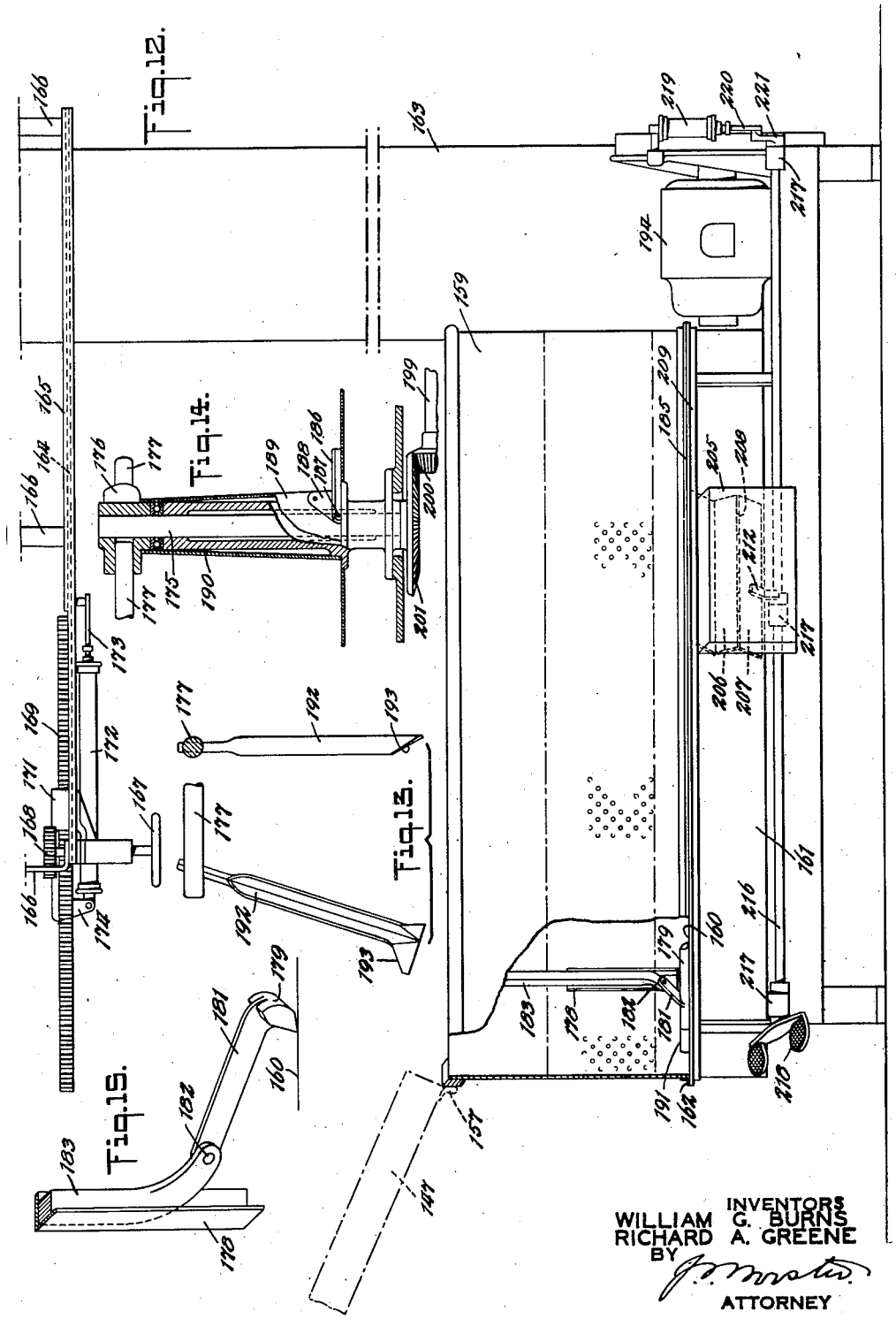

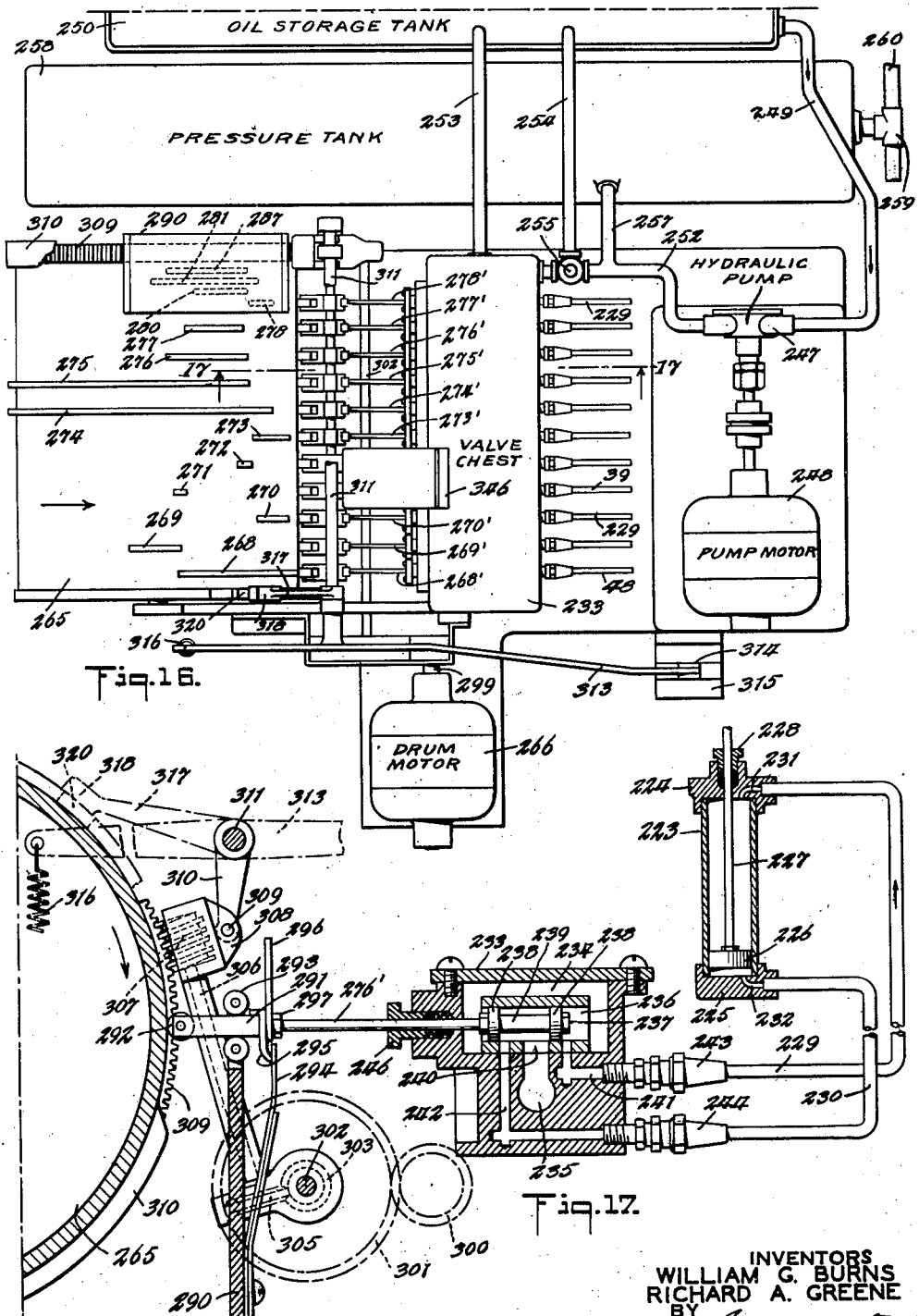

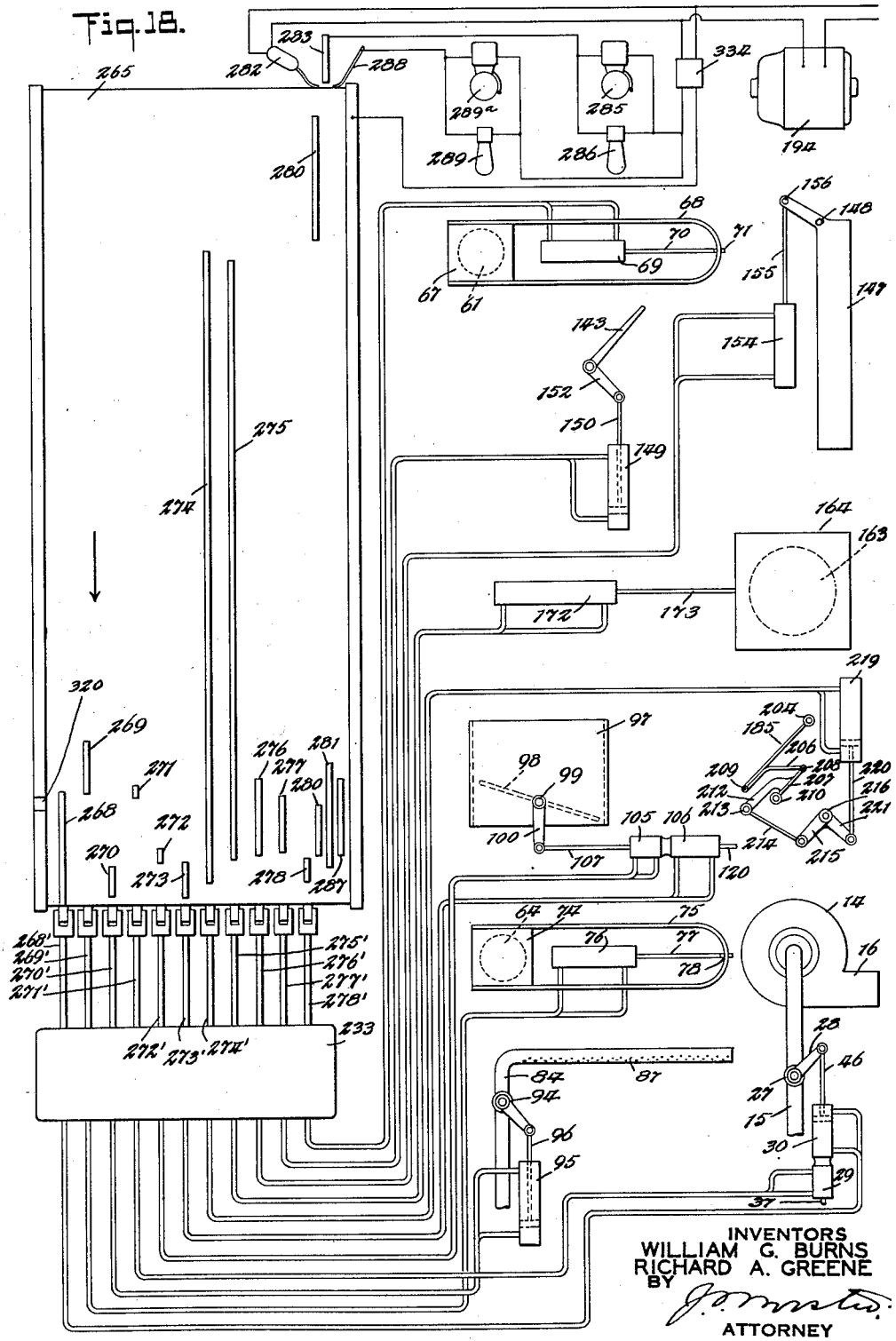

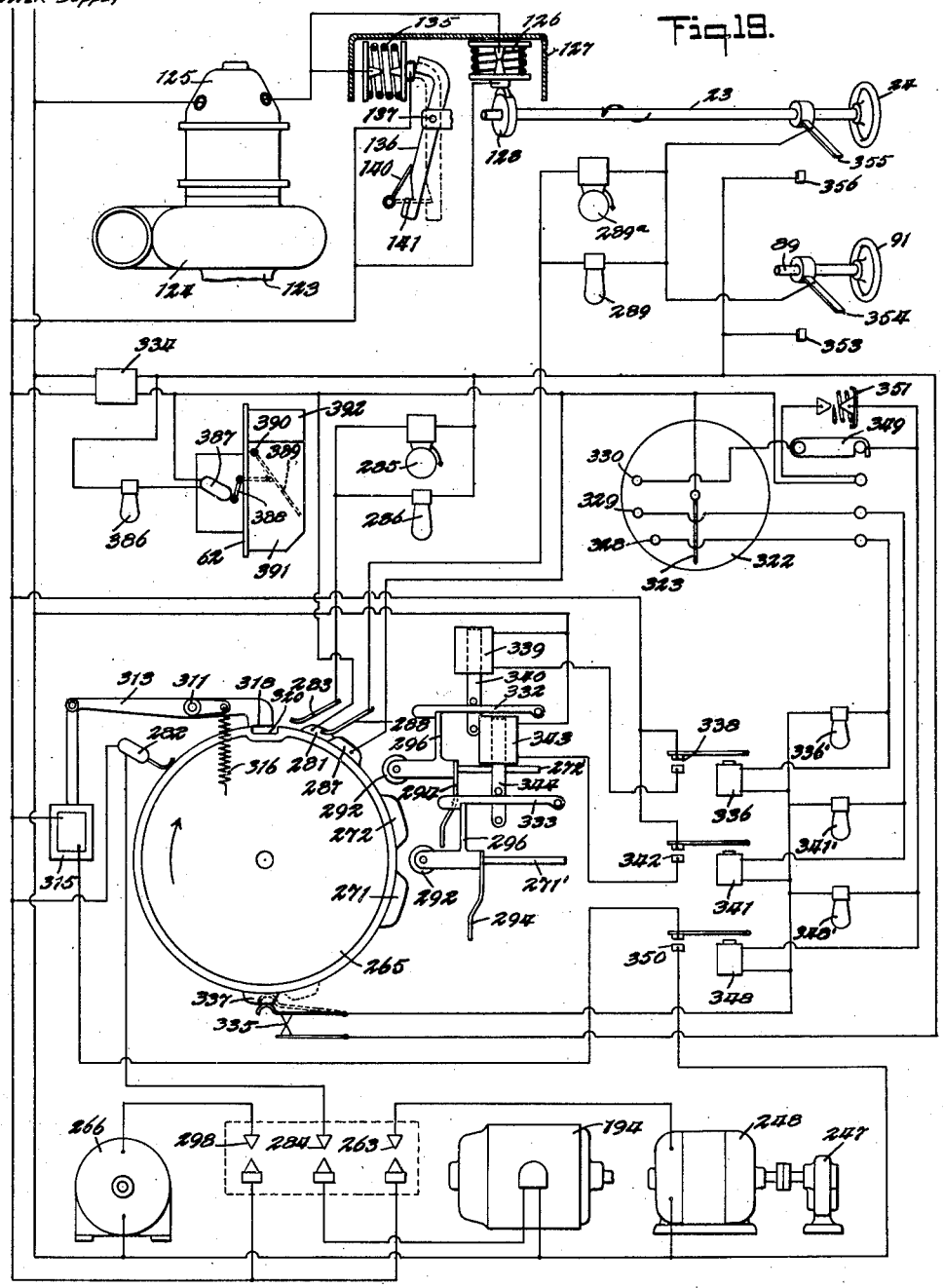

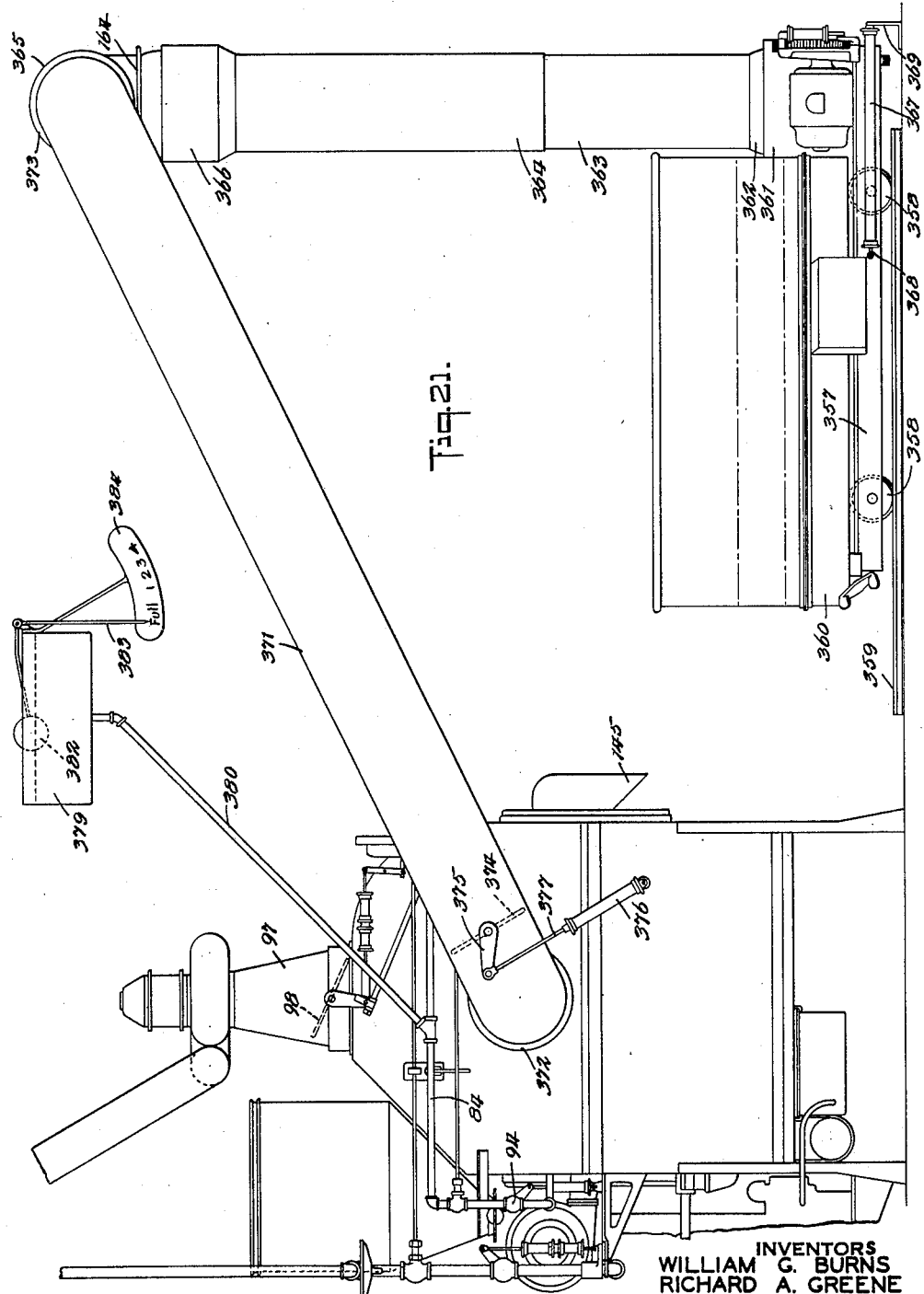

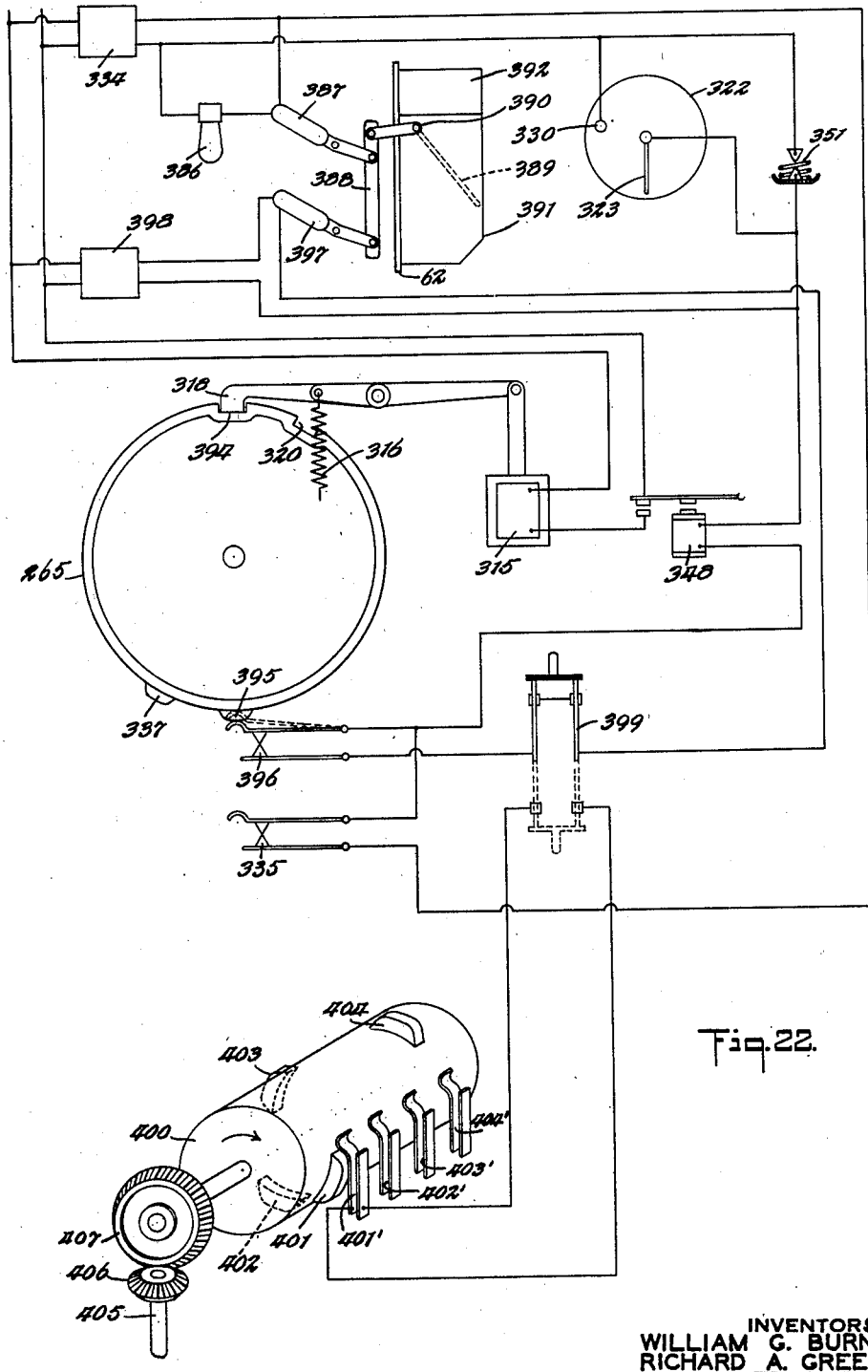

Patented Aug. 6, 1935

2,010,582

UNITED STATES PATENT OFFICE 2,010,582

AUTOMATIC ROASTER AND COOLER

William G. Burns, New York, and Richard A. Greene, Brooklyn, N. Y., assignors to Jabez Burns & Sons, Inc., New York, N. Y., a corporation of New York Application June 18, 1932, Serial No. 618,002

20 Claims. (Cl. 34—5)

This invention relates to apparatus for roasting coffee, cocoa beans, nuts, cereals or other similar commodities.

Since roasting apparatus for such products is used chiefly for treating coffee beans, the present invention is described as applied to and operated for this work. It will be appreciated that the invention is applicable also to the roasting of other materials as indicated.

Green coffee is roasted by the application of heat during a time interval in which moisture is driven off and certain chemical changes are brought about. Moreover, the heat must be supplied at a rate sufficiently rapid to develop a certain swelling and opening of the berry, as slow heating results in a product that is merely baked. This development is well recognized by the trade as essential for satisfactory infusion of the ground product.

In addition to the physical development of the berry, a progressive change of color is effected and the end-point of a roast is reached when the coffee has been brought to any desired shade of brown.

Since it is well established that successive batches of the same size and character have the same temperature when they reach any given color, this end-point may be determined by temperature as well as by color. Obviously, it may also be determined by time alone, when the heat application and the quantity and character of the goods are under accurate control.

Furthermore, the successful completion of the roasting process requires means for cooling the hot material promptly and uniformly.

Prior to this invention, two different methods have been employed in commercial roasting. The more widely accepted is a process whereby relatively large batches are roasted individually in machines which are controlled manually by a skilled operator. The other is a continuous process in which a small stream, or a succession of very small batches, is carried through the apparatus in such a way that beans in all stages of development—from green to completely roasted—are in the apparatus at the same time.

In the existing continuous process, the time interval is fixed by the speed of the mechanism. Therefore, to approach uniform results, expert manipulation of the heating means (including flue drafts) and frequent inspection of the discharging coffee are necessary. Moreover it is obvious that the flow of goods must be perfectly uniform and that there must be no variation in moisture content. In commercial operation, it is virtually impossible to control these conditions accurately. Hence, successive samples, or small batches, discharged by the machine may vary appreciably in development and color, so that it is necessary to mix the goods in large batches after roasting, to equalize such variations.

Individual batch roasting, on the other hand, assures uniformity of color and development throughout each batch. It equalizes variations in moisture content and does not permit one part of the mass to reach a higher degree of development than any other. It also assures uniformity of one batch as compared with another because the correct end-point of each roast can be checked exactly by the eye of the operator, by an electric eye (such as a photo-electric cell), by a suitable time clock or by temperature control.

An object of this invention is to combine individual batch roasting with continuous operation by providing automatic control of the relationship between time, heat application, quantity of material and temperature, during the roasting and cooling processes.

A further object of the invention is to reduce the labor required for roasting, and virtually to eliminate human error by providing automatic means for operating the roasting and cooling mechanism and for determining the desired end-point for each roast.

This invention provides automatic means for measuring each batch and transferring it to the roaster feed hopper; for passing the measured batch into the roaster at the proper time; for applying and properly regulating the heating means; for discontinuing the roasting at any desired point; for checking the roast within the cylinder by application of a suitable cooling medium, if desirable; for discharging the roasted batch into the cooler; for starting the cooling means, mechanically stirring the coffee and for discharging it from the cooler box.

All of the foregoing operations can be performed without any attention on the part of the operator. One man can supervise a large number of machines; there is no loss of time between the various operations; and, due to the fact that each batch of coffee is roasted by a definite application and regulation of the heating means and taken off at a definite predetermined temperature, there is a uniformity in the product and a development in the coffee that cannot be equalled by the small batch continuous process or manually by an operator, no matter how skilled he may be.

If the automatic roasting of the batch is to be done by time alone, it is necessary carefully to equalize the moisture content of the green coffee blend, usually by storage of large amounts for long periods (as required by the continuous process described above); the automatic roasting of each batch can then be performed with a satisfactory degree of uniformity. However, the usual commercial roasting plant cannot afford long storage of large quantities of coffee and so, in practice, the blends of coffee will vary slightly in each batch. Roasting by means of a fixed time interval is, therefore, less desirable than control by thermostatic means.

For such batch-roasting the final development can be accurately obtained by roasting the coffee to a predetermined temperature, the regulation of the heat during roasting and the final shut-off being effected by thermostatic control; and this method produces very uniform roasting results. Therefore, in the description of this invention we shall apply to it the practical roasting of large batches using thermostatic control in what we would call automatic continuous batch roasting. This automatic roaster, or combination automatic roaster and cooler contemplates the actual roasting of the material by temperature control, all other operations being performed in accordance with a definite time cycle which commences at the conclusion of each roast.

In carrying out this invention, we provide means so that the various operations will be performed properly when the apparatus is started up for the day's work, or after a shut-down, or when the machine is empty; for shutting down when the operator wishes; for the manual control of any one or more of the operations without interfering with the automatic operation of the others; for eliminating when desirable the temperature control and permitting the operator to close an electric switch when the roast has reached the end-point he desires, the shut-off of the gas and the cycle of operations then going on mechanically and automatically just as though the thermometer had functioned; and for easily disconnecting the various motive parts and permitting the operator to roast batches in the ordinary way.

In operating a commercial roaster, the duties of the roasterman are many. He is relied upon to give particular attention to the application and regulation of the heat, the regulation of the draft and the termination of the roasting when each batch has reached the desired end point, this usually being determined by comparison of its color with a standard. In addition to the above duties he must see that each batch is measured and passed into the roaster, and when the roast is finished, must discharge it into a cooler box or car. This box has a perforated bottom and a chamber below the bottom connected to an exhaust main. The box is usually mounted on wheels set on tracks in front of the roaster so that the operator can move it up to the roaster to receive a charge; and then move it away from the roaster. When the coffee has cooled the box is emptied and is ready to be moved back to the roaster for another charge. During cooling the operator must thoroughly agitate the beans by a shovel unless mechanical means are provided such as rotating paddles or stirrers, to allow the cooling air to be drawn through every part of the hot mass of coffee. Mechanical stirring is more efficient than manual stirring but it also requires supervision of the operator to start and stop the cooling and to discharge the material when cooled.

This invention provides a roaster, and combination roaster and cooler, in which the above functions are performed automatically by motors or switches operating in predetermined sequence by a control member which is set in motion at the end of each roast. In the preferred form this is accomplished by hydraulic motors or power cylinders controlled by a rotatable member which is set in motion when the roasted coffee reaches the desired temperature and; which comes to rest at the conclusion of one complete cycle. During this cycle the batch of material is discharged and cooled and the succeeding match is measured and fed to the roaster and the roasting operation is begun, all except the actual roasting operation being performed at definite time intervals.

The roasting operation itself is dependent upon temperature and is controlled by a thermostatic switch unit having a thermometer bulb mounted inside the roaster and arranged to contact directly with the roasting material. When the desired final temperature is reached, the thermostatic switch shuts off the supply of gas or other fuel, and the time cycle of operations begins and continues until the cooling is completed and the cooler box emptied; and during this time cycle another batch of material is fed to the roaster, the gas is turned on and the roasting operation started.

The final roasting temperature, and hence the setting of the thermostatic switch, will depend upon the particular material to be roasted, upon the different kinds or blends of the material in the batch, and upon the degree to which the roasting is to be carried. When it is not desired to roast by temperature, the thermostatic switch is disconnected, and the gas or other heating means shut off by hand when inspection shows the material is roasted. Or the time cycle may be started by closing an electric switch when the material is roasted; the gas will shut off automatically (and the time cycle continues to completion).

The automatic mechanism performs all operations with precision and at definite time intervals, thus utilizing the machines to their full capacity and turning out successive roasts which are uniform in all respects. In carrying out the invention, various novel combinations and sub-combinations in the measuring, feeding, roasting, discharging and cooling mechanisms are also employed. All these and numerous other features and advantages of the invention will be described in connection with the apparatus shown in the accompanying drawings, in which:

Fig. 2 is a side view of the roaster showing the smoke pipe and damper, the discharging mechanism, and portions of the interior;

Fig. 3 is a front view showing the discharging mechanism and various indicators and warning signals;

Fig. 4 is an elevation showing double power cylinders controlling the flow of gas to the roaster, similar cylinders being used to control the damper in the roaster smoke pipe;

Fig. 5 is a cross-sectional view of a needle valve and check valve for regulating the flow of hydraulic liquid in one of said double power cylinders;

Figs. 6 and 7 are detail views showing means for adjusting the gas cock to increase or decrease the flow of gas;

Fig. 8 is a detail view showing a safety lock for the feed hopper gate;

Figs. 9 and 10 are detail views of the damper control mechanism and illustrate the method of changing from hydraulic to manual operation;

Fig. 11 is a plan view of the cooler box and slide for controlling the suction in the air pipe which is connected to the suction chamber of the cooler box;

Fig. 12 is a side elevation of the cooler box with parts broken away to show the interior;

Figure 1:
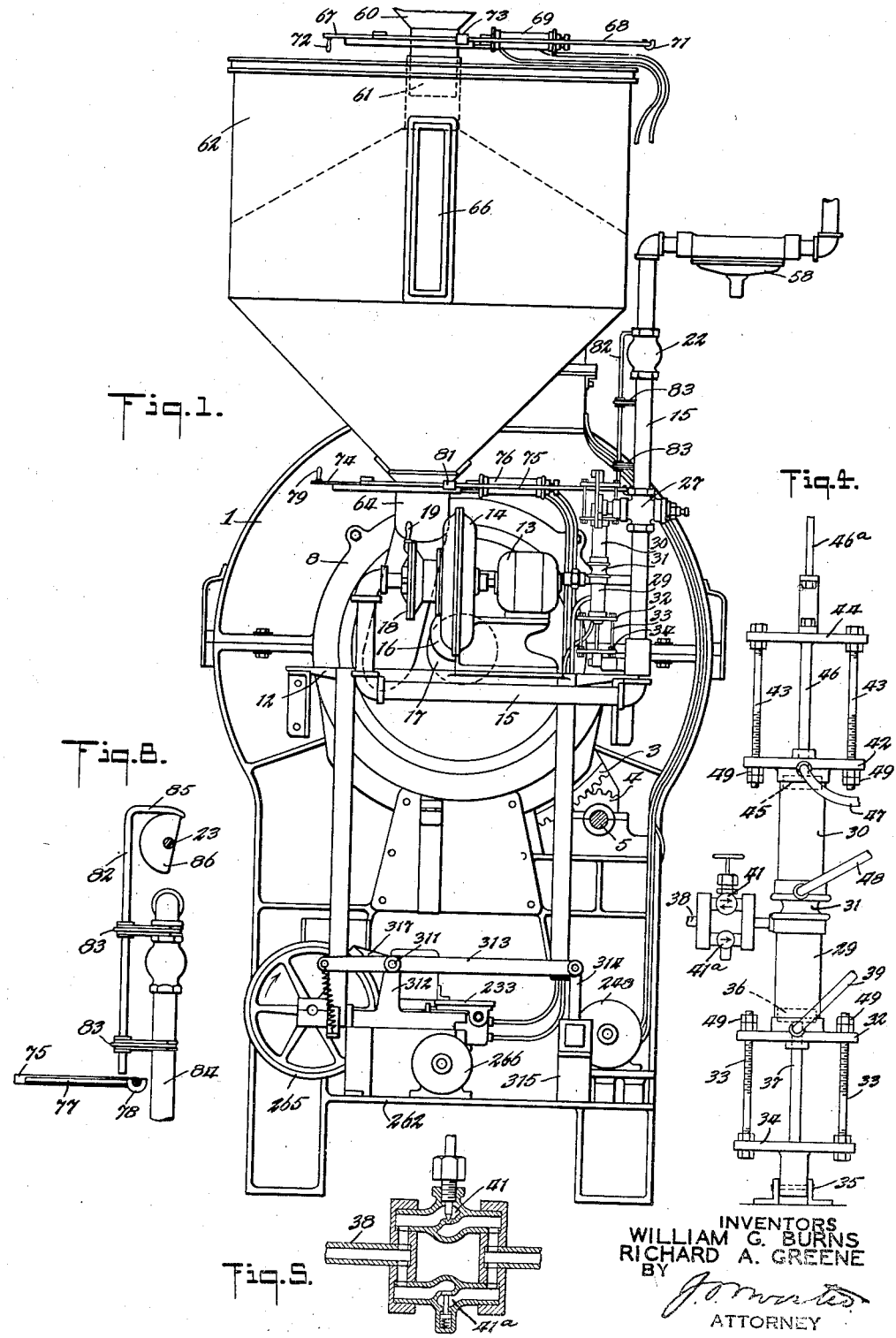
Fig. 1 is a rear view of the roaster showing the feed hopper, gas burner, and hydraulic mechanism.

Figs. 13, 14, and 15 are detail views showing the construction and arrangement of the several stirrers and scrapers for agitating and leveling the material and discharging it from the cooler box;

Fig. 16 is a plan view of the hydraulic system, showing the control member or cam drum, hydraulic valve chest, motors, oil pump, oil storage tank and pressure tank;

Fig. 17 is a transverse section on line 17—17 of Fig. 16, showing the drum operating mechanism and the connections between the valve chest and the power cylinders;

Fig. 18 is a diagram of the hydraulic system;

Fig. 19 is a composite diagram of all the electrical circuits;

Fig. 20 is a detail view showing means for housing the thermometer bulb in the path of the coffee inside the roaster;

Fig. 21 is a side view of a combined automatic roaster and cooler embodying various modifications of the invention; and Fig. 22 is a diagrammatic view showing means for preventing the beginning of the roasting operation when the feed hopper does not contain a batch of green coffee, and showing a master control for operating a plurality of roasters on a time schedule.

In order to simplify the description, the various parts of the roaster, cooler, etc., will be described under separate headings which will be followed by a description of the hydraulic system and the method of operation.

Roaster

The roaster shown in Figs. 1 to 3 is similar in general construction to the manually controlled roaster disclosed in Patent #1,532,574 to W. G. Burns and H. R. Maxon, dated April 7, 1925.

This roaster has a casing 1 in which is mounted a rotary and preferably perforated drum 2 adapted to hold the material to be roasted. Gear 3 is mounted on one end of drum 2 and cooperates with pinion 4 on shaft 5 which is driven by any suitable source of power.

A plurality of lifting vanes 6 are arranged inside drum 2 for the purpose of carrying the material from the bottom to the top and constantly agitating the beans during roasting. Pan 7 is located beneath drum 2 to receive chaff and dirt which fall through the perforations of the drum.

The ends of casing 1 and drum 2 are closed by stationary disks 8 and 9 which are bolted or otherwise secured to the frame. Disk 8 is at the back or feed end, while disk 9 is at the front or discharging end of the roaster. Within the central portion of the drum and supported from disks 8 and 9 is a tent-shaped hood or spreader 10 to prevent the transversely-moving, lengthwise-extending sheet of coffee beans or other material from coming in contact with the flame when said material is lifted and dropped by vanes 6. The casing has a number of cover plates 11 which may be removed to enable the roaster to be cleaned.

Heating the roaster

Heating is preferably accomplished by means of a motor-driven gas burner arranged to mechanically mix the gas with any desired volume of air. The burner, as shown in Fig. 1, is mounted on platform 12 secured to the casing and includes motor 13, air and gas blower or mixer 14, gas supply pipe 15, and burner nozzle 16 adjacent an opening 17 in the back disk 8. Nozzle 16 points slightly downward and to one side so that, under the combined influence of the revolving drum and smoke-pipe draft, the flame is substantially horizontal as shown in dotted lines in Fig. 2. The amount of air admitted to the burner is controlled by adjustable shutter 18 provided with openings which communicate with inlet ports in blower 14. This shutter is adjusted by means of handle 19, and its position regulates the amount of air passing through the inlet ports and determines the characteristics of the flame, such as its length, color and temperature. An auxiliary gas supply pipe 20 is located adjacent nozzle 16 to provide a pilot flame.

The flow of gas in supply pipe 15 is controlled by a manually operated valve or gas cock 22 which is connected by rod 23 to hand wheel 24 with a pointer cooperating with dial 25 on the front of the roaster. The position of the pointer indicates the flow of gas through the valve.

Flow of gas in pipe 15 is also controlled by an automatic valve or gas cock 27 having lever 28 operated by a dual or "double-acting" system of hydraulic motors or power cylinders 29 and 30 best shown in Fig. 4. The purpose of this power cylinder combination is to close the gas cock 27 in two steps, one cylinder partly closing the gas cock when the coffee or other material reaches a predetermined intermediate temperature, and the other cylinder completing the closure of the gas cock and thus shutting off the gas when the coffee is fully roasted. This cylinder combination may be made to regulate the gas in three or even more steps; or to gradually shut off the gas by means of the needle valve hereinafter described.

The fluid chambers of power cylinders 29 and 30 are independent of each other, but the adjacent heads of the cylinders are mechanically connected by an external coupling 31 shown in Fig. 4. The lower end of cylinder 29 has head 32 by means of which the cylinder is slidable on threaded rods 33 secured to yoke 34 which is pivoted at 35 to the frame of the machine. This power cylinder has power piston 36 and piston rod 37 which has its outer end secured to yoke 34. Hydraulic tubes 38 and 39 are connected to ducts in the respective cylinder heads, tube 38 leading through a needle valve 41 and check valve 41a to regulate the flow of oil or other liquid used in the hydraulic system.

The upper end of power cylinder 30 has head 42 by means of which this cylinder is slidable on threaded rods 43 which are secured to yoke 44. This cylinder has power piston 45 and piston rod 46 which has its outer end secured to yoke 44 provided with a bifurcated or hooked arm for the attachment to rod 46a which is connected to operating lever 28 of gas cock 27, as shown in Figs. 4 and 6. Hydraulic tubes 47 and 48 are connected to ducts in the respective heads of power cylinder 30. In order to vary the stroke of power pistons 36 and 45 it is simply necessary to vary the effective lengths of the threaded rods 33 and 43 by adjusting the respective nuts 49.

Needle valve 41 and check valve 41a operate as follows: Fluid can pass through needle valve 41 slowly in either direction, but can pass through check valve 41a in but one direction, that when fluid is passing into the cylinder through tube 38. Therefore when the fluid passes through tube 38 and check valve 41a into the top of cylinder 29 it depresses the piston, the cylinder rises and the gas valve is moved quickly. When the fluid passes out of the top of cylinder 29 it cannot pass check valve 41a but must escape slowly through needle valve 41 and tube 38 so cylinder descends slowly and moves the gas valve slowly, the rate of movement depending upon the position of needle valve.

In the condition shown in Figs. 1 and 4 oil or other liquid in the hydraulic system has been forced through tube 38 and check valve 41a into power cylinder 29, tending to depress piston 36; but since piston rod 37 is secured to stationary yoke 34, cylinder 29 ascends. In ascending, cylinder 29 likewise raises cylinder 30 and piston rod 46, thus moving lever 28 and partly opening gas cock 27.

In the condition shown in Figs. 1 and 4 the liquid has also been forced through tube 48 into power cylinder 30, raising piston 45, and piston rod 46, thus further moving lever 28 and further opening the gas cock 27. It will thus be seen that the gas cock is wide open when the parts are in the position shown in Figs. 1 and 4, and this is the actual position of the gas cock during the greater part of the roasting operation.

Means for controlling power cylinders 29 and 30 will be explained in detail in the subsequent description of the hydraulic system. For the present it is sufficient to state that gas cock 27 is partly closed, at a predetermined intermediate temperature during the roasting operation, by reversing the direction of the liquid in hydraulic tubes 38 and 39. This forces the liquid through tube 39 into lower end of power cylinder 29, thus lowering cylinder 29, and likewise lowering cylinder 30 and piston rod 46, which partly closes the gas cock 27. In practice, needle valve 41 is preferably adjusted to retard the flow of liquid from cylinder 29 so that the gas cock will be turned down slowly when the predetermined intermediate temperature is reached. When the roasting material reaches the desired end-point the direction of the liquid in hydraulic tubes 47 and 48 is reversed. This depresses piston 45 and piston rod 46, thus fully closing gas cock 27 and shutting off the gas.

Manually operated gas cock 22 is adjusted preparatory to automatic operation of successive batches, to regulate the maximum flow of gas to the burner. Gas cock 27 is used to permit of turning down the gas at one or more intermediate points and completely shutting it off. The double cylinders 29 and 30 permit of one turn down and triple cylinders would permit of two turn downs, but general practice requires but one. The flow of gas at the intermediate or turned down position is regulated by the adjusting device shown in Figs. 6 and 7 and closer regulation is gained by varying the stroke of power piston 37 by means of threaded rods 33 and nuts 49. In the device shown in Figs. 6 and 7 the operating lever 28 has circular aperture 50 which fits loosely over rectangular stem 51 of the gas cock, and this lever is adjustably secured to disk 52 having a rectangular aperture which fits snugly over stem 51. Lever 28 and disk 52 are adjustably connected by nuts and bolts 53 which pass through arcuate slots 54 in the lever.

To adjust gas cock 27 for greater or lesser flow, nuts 53 are loosened and stem 51 is rotated by handle 55 of disk 52. When the gas cock is adjusted to the desired point, nuts 53 are tightened to clamp lever 28 to disk 52. Connecting rod 46 of power cylinder 30 is fastened to a pin 56 which may be moved back and forth in slot 57 in outer end of lever 28 to provide additional adjustment of gas cock 27.

In some communities the gas supply is subject to fluctuations. To insure a uniform supply to the gas burner pipe 15 is provided with a pressure 58 as shown in Figs. 1 and 2.

*Charging the roaster*

Figs. 1 and 2 show means for supplying green coffee to the roaster in measured batches. A bin or reservoir 60 is arranged above the roaster with discharge spout 61 emptying into feed hopper 62 mounted on the back or charging end of the roaster by means of flanges 63. The lower end of feed hopper 62 is provided with discharge spout 64 leading into the interior of the roaster drum through an opening in disk 8. Hopper 62 holds a measured charge of green coffee as shown in dotted lines in Figs. 1 and 2. A sight glass 66 enables the operator to observe the level of material in the hopper.

The flow of material from bin 60 to feed hopper 62 is controlled by gate 67 which slides in discharge spout 61 and is provided with handle 68. This gate is operated by a single power cylinder 69 having power piston and piston rod 70 whose outer end is shaped to form hook 71 which engages handle 68 as shown in Figs. 1, 2, and 18. When it is desired to dispense with automatic operation hooked end 71 of piston rod 70 is disconnected from gate handle 68, permitting the gate to be operated manually by a handle or knob 72. The elongated arms of handle 68 slide in guides 73 as shown in Fig. 1.

The flow of material from feed hopper 62 to the roaster is controlled by gate 74 which slides in discharge spout 64 and is provided with handle 75. This gate is operated by power cylinder 76 having power piston and piston rod 77 whose outer end is shaped to form hook 78 which engages handle 75 as best shown in Fig. 18. When it is desired to operate gate 74 by hand hooked end 78 of piston rod 77 is disconnected from handle 75 as previously described. This gate has a knob 79 for manual operation. The elongated arms of handle 75 slide in guides 81 in the manner previously described.

In discontinuing roasting operations, gate 74 should be locked in closed position when the gas is turned off at the end of the last roast because, for reasons hereinafter explained, green coffee would otherwise enter drum 2 before the last cycle of operations stopped and would then be discharged without being roasted when automatic operations were resumed, and this is prevented by an automatic safety gate lock shown in Fig. 8. This lock consists of a vertical bar 82 sliding in bearings 83 conveniently mounted on water pipe 84 and has a horizontal upper shoulder 85 overlying cam 86 which is secured to manually operated gas control rod 23. When gas valve 22 is open the cam 86 will be in the position shown in Fig. 8 and locking bar 82 will be raised out of engagement with handle 75 of feed hopper gate 74. In order to close gas valve 22 hand wheel 24 is rotated, thus rotating rod 23 and cam 86 and allowing locking bar 82 to descend by gravity until its upper end 85 rests on the flat edge of cam 86 and its lower end fits inside the rim of gate handle 75. To open the feed hopper gate it is necessary to move it to the left as viewed in Fig. 8, but such movement is prevented by handle 75 striking against locking bar 82 when gas valve 22 is closed as described.

Spraying the roasted material

Water pipe 84 supplies water to spray pipe 87 which extends longitudinally inside drum 2, just beneath the apex of hood 10, to spray the coffee and check the roasting when it has reached the desired end-point.

The flow of water in pipe 84 is controlled by manually operated spray cock or valve 88 which is connected by rod 89 to hand wheel 91 which has a pointer cooperating with a dial 92 on the front of the roaster. The position of the pointer indicates the flow of water through the valve. A spray gage 93 is connected to pipe 84 at the front of the roaster to record the amount of water delivered between the opening and closing of the spray valve.

The flow of water to the spray pipe is also controlled by an automatic spray cock or valve 94 which is operated by power cylinder 95 and piston rod 96. When the roaster is operated manually automatic spray cock 94 will remain open and the flow of water to spray pipe 87 will be controlled solely by hand wheel 91. When the roaster is operated automatically hand spray cock 88 is first set to permit the desired flow of water, and thereafter spray cock 94 operates automatically to turn the water on and off.

Smoke pipe and damper

Waste products of combustion, vapors, steam, etc. from the roaster cylinder first pass into dome 1a mounted on top of the roaster, and then pass out through smoke pipe 97 on top of the dome.

This smoke pipe has a damper 98 mounted on rod 99 which is pivoted in the smoke pipe and has one end projecting outside where it is attached to lever 100 as shown in Figs. 2, 9, and 10.

In Fig. 2 damper 98 is in the "closed" position, but it is adjusted so that it cannot completely close the pipe. The damper is opened by moving lever 100 to the left, as viewed in Fig. 2, until it strikes limiting pin 101, at which time the damper will assume a vertical position. Lever 100 may be operated manually or automatically and means are provided for shifting instantly from one mode of operation to the other. For hand operation lever 100 is connected to an operating rod 103 terminating in hand wheel 104 at the front of the roaster.

Lever 100 is operated automatically by a dual or "double-acting" system of power cylinders 105 and 106 as shown in Fig. 2. This power cylinder combination is similar to that of power cylinders 29 and 30 previously described. Its purpose is to open damper 98 in two steps, cylinder 105 partly opening the damper when the coffee reaches a predetermined intermediate temperature, and cylinder 106 moving the damper to the full open position when the coffee is fully roasted. A needle and check valve unit 102 is connected in the hydraulic tube circuit leading to power cylinder 105; and the needle valve is preferably adjusted so as to cause damper 98 to open slowly when the predetermined intermediate temperature is reached. Cylinder 105 has a power piston and piston rod 107 connected to bar 108 which is connected to lever 100 for automatic operation, and is disconnected therefrom when it is desired to shift to manual operation. These controls, and their mode of operation, will now be described with special reference to Figs. 2, 9, and 10.

Rod 103 is round at its upper end 109 where it fits in a hole in block 110 which is pivoted to and spaced from the lower end of lever 100 by bolt 112. A collar 113 fits over the upper end 109 of rod 103 and is fastened thereto in any suitable manner so as to hold the upper end of rod 103 in rotatable engagement with block 110. Consequently, when hand wheel 104 is turned, rod 103 will rotate in block 110, and collar 113 will rotate with rod 103 to which it is attached. The collar 113 has an integral L-shaped finger 114 which is best shown in Figs. 9 and 10.

Bar 108, on end of piston rod 107, fits loosely in the space between lever 100 and block 110, and has slot 115 which engages bolt 112. When the parts are in position shown in Figs. 2 and 9 bolt 112 engages slot 115 and movement of bar 108 toward the left, caused by the operation of either of the power cylinders 105 or 106, will move lever 100 and open damper 98. When the parts are in this position lower end of the rod 103 rests loosely in a slot in the bracket 116 attached to the front frame or plate of the roaster, as shown in Fig. 3, so that rod 103 slides up or down when the damper is opened or closed by the power cylinders.

When it is desired to regulate the damper by hand, hand wheel 104 is first rotated through an angle of 180 degrees in a counter-clockwise direction as viewed in Fig. 3, thus rotating rod 103 and finger 114 in the direction of the arrow in Fig. 9. As the finger rotates, it travels underneath bar 108 and raises bar up until slot 115 is disengaged from bolt 112 as shown in Fig. 10. Subsequent operation of either power cylinder would not operate the damper because bar 108 would merely slide on finger 114 which holds the bar out of engagement with bolt 112. In this position bar 108 can not slip off finger 114 because of the L-shaped guard on the finger. The damper may now be operated by grasping hand wheel 104 and sliding rod 103 back or forth in slot 116. The end portion of rod 103 is provided with a plurality of teeth 117 which engage the bottom edge of slot 116 and enable the rod to be locked in any desired position. When it is desired to return to automatic operation hand wheel 104 is rotated through an angle of 180 degrees in a clockwise direction as viewed in Fig. 3, returning parts at the upper end of rod 103 to the position shown in Fig. 9, and returning lower toothed end of the rod to the position shown in Fig. 3 with teeth 117 upright and out of engagement with the bottom edge of slot 116.

Figs. 2 and 3 show means when operating automatically for manually adjusting the position of power cylinder unit 105 and 106 to regulate the position of damper 98. A lever 118 is pivoted at 119 to the roaster casing. One end of this lever is pivoted to piston rod 120 of cylinder 106 and the other end is pivoted to an adjusting screw 121 which terminates in a small hand wheel 122 on the front of the roaster. By turning hand wheel 122 cylinders 105 and 106 may be moved as a unit to the left or right, as viewed in Fig. 2, thus regulating the position of the damper, without interference with its automatic operations.

Smoke pipe 97 may be connected to any available exhaust main of sufficient capacity. The quality of the roast is affected by fluctuations in the draft and these will occur if two or more roasters are connected to the same exhaust unless the roasts are made in sequence. Therefore, we prefer to use an individual exhaust main and exhaust fan for each roaster, and we show smoke pipe 97 connected to an individual exhaust main 123 and exhaust fan 124 driven by an electric motor 125. A vertical type motor is shown in Fig. 2. The outlet pipe from fan 124 is carried to the outside atmosphere or into a collector of one of the standard types.

Fan 124 should always be running when the roaster is operating. This is accomplished by switch mechanism shown in Figs. 2 and 19. Fan motor 125 is connected to any standard power circuit and is controlled by a push button switch 126 mounted in box 127 on the side of the roaster adjacent the manually operated gas control rod 23. This rod has a roller cam 128 which depresses and closes push-button switch 126 and starts the motor whenever control rod 23 is rotated in the direction of the arrow in Fig. 19 to open gas cock 22.

When gas cock 22 is closed it is sometimes desirable to keep exhaust fan 124 running to thoroughly ventilate the roaster and remove loose dirt, etc. To permit this, a second push-button switch 135 is connected in shunt across the contacts 126 and is operated by lever 136 which is pivoted to box 127 at 137 as shown in Fig. 19. When lever 136 is pressed on the push-button of switch 135 it closes the switch contacts and completes the energizing circuit of fan motor 125 through conductors 138 and 139 in shunt to the contacts of switch 126; and may be locked in this position by engaging pawl 140 in notch 141 in the lever.

Discharging roaster

The discharge of roasted coffee through the opening in front disk 9 is controlled by swing gate 143 which is pivoted at 144 in discharge spout 145 as shown in Fig. 2. This spout 145 has sides 146, and a discharge chute 147 is pivoted at 148 at the lower ends of these sides. In Figs. 2 and 3 swing gate 143 is in the forward or non-discharging position and discharge chute 147 is hanging down in its non-discharging position. When swing gate 143 is in this position there is an opening between the disk 9 and the top of the swing gate to permit easy testing of the charge and to permit a good view of the flame. In order to discharge the goods swing gate 143 must be swung inwardly, or within the roaster, and discharge chute 147 must be swung upwardly to the position shown in Fig. 12.

Swing gate 143 is operated by power cylinder 149 having power piston and piston rod 150 connected to one end of crank 152, the opposite end of which is suitably connected to pivot 144 of the swing gate as shown in Fig. 3. When power cylinder 149 is operated, crank 152 causes pivot 144 to rotate and open or close swing gate 143 as the case may be. The swing gate may also be operated by handle 153 which is also connected to pivot 144 as shown in Fig. 3. When operating the swing gate by hand piston rod 150 is first disconnected from lever 152.

Discharge chute 147 is operated by power cylinder 154 having power piston and piston rod 155 connected to the outer end of counterweight 156 which is secured to pivot rod 148 of the discharge chute. When piston rod 155 is pulled down by power cylinder 154 discharge chute 147 swings up to the position shown in Fig. 12, where it is ready to discharge the roasted coffee into the cooler box. Counterweight 156 will hold the discharge chute in this position, even when operated by hand, until the chute is returned to the non-discharging position shown in the drawings. A strip of felt or other suitable material 157 is secured to the lower edge of the discharge chute to insure a snug fit with the rim of the cooler box.

Cooler box

The cooler box shown in Figs. 11 and 12 is generally similar to that disclosed and claimed in our application Serial No. 387,840, filed August 23, 1929, now Patent No. 1,870,355, and is more particularly of the type disclosed and claimed in an application of R. A. Greene, Serial No. 620,441, filed July 1, 1932, now Patent No. 1,958,301.

It is circular in form and comprises a side 159, perforated bottom or plate 160, and lower suction chamber 161. The upper portion is made independent of the suction chamber, and the latter has the perforated bottom 160 attached to it. These upper and lower portions are provided with adjacent peripheral flanges 162 and are rigidly clamped together in any suitable manner.

Side 159 is preferably perforated to permit some fresh air to be drawn directly into the lower strata of the material to be cooled, and thereby aid in effecting more uniform cooling than is obtained when the air is drawn only through the top. These perforations, as well as the perforations in bottom 160, are of such size as to allow passage of air without passage of the coffee beans or other material being cooled.

Suction box 161 extends through the side of the cooler and is connected to air pipe 163 leading to a suction main or exhaust pipe. Suction in pipe 163 causes air to be drawn downwardly through the mass of material in the cooler. Suction in pipe 163 is controlled by slide 164 which moves in a frame 165 supported by hangers or brackets 166. In Figs. 11 and 12 the slide is shown open, and may be closed by moving it to the right until it closes the opening in air pipe 163 and thus shuts off the suction.

Slide 164 is operated by hand wheel 167 carrying pinion 168 which meshes with rack 169 having one end connected to the slide. This rack slides in bearing 171 which is attached to frame 165. Hand wheel 167 may be pushed upwardly to raise pinion 168 out of engagement with teeth of rack 169 when the slide is to be operated automatically. The slide is also operated by power cylinder 172 having power piston and piston rod 173 which is connected to the slide as shown in Fig. 12. Cylinder 172 is pivoted to lug 174 depending from frame 165, allowing the cylinder to adjust itself sufficiently to prevent slide 164 from binding in frame 165.

The cooler box is provided with a central shaft 175 carrying radial extensions 176 here shown to be three in number. Extensions 176 each support an arm 177 parallel with perforated bottom 160 as shown in Fig. 11. These arms support a series of vertical stirrers 178 which reach down almost to the bottom 160, but do not touch it. Stirrers 178 are of V-shaped cross-section and are set with the sharp edge in front, thus providing hollow channels in back which extend above the mass of coffee in the cooler.

Shaft 175 carrying arms 177 and stirrers 178 is rotated in a clockwise direction, as viewed in Fig. 11, causing the forward sharp edges of the stirrers to plow through the beans, turn them over, and push them aside. In the short time required for the beans to fill the spaces left by the stirrers, a current of air is drawn through the V-shaped channels of the stirrers and part-way through the mass of beans. The main stream of air which is drawn through the upper strata becomes heated by contact with the beans, and the addition of cool air at a point between the upper and lower layer dilutes the already heated air stream and cools it. The point at which the air is drawn behind the stirrers depends upon their shape and speed of rotation. The two air streams have the same effect as though the mass of beans were spread out in a thin layer of much greater area.

The cooler is also provided with a number of scrapers 179 which assist in stirring and leveling the coffee, and also propel it toward discharge opening 180 in bottom 160, at the conclusion of the cooling operation. These scrapers may be made of iron, bronze, aluminum or any other suitable material and preferably consist of bars having stems 181 which are pivoted at 182 to vertical rods 183 carried by the rotatable arms 177. Rods 183 are also utilized to support stirrers 178 as shown in Fig. 15. Scrapers 179 are so distributed, and are arranged at such angles that they sweep over the entire bottom of the cooler and cooperate to propel the material toward the outermost scraper which rotates in a path which includes the discharge opening 180.

When the cooler is filled with coffee, the mass inertia of the beans causes the rotating scrapers 179 to swing up on their pivots 182 and rise off the bottom of the cooler. As arms 177 continue to rotate they drag the scrapers along in this position, stirring and leveling the coffee. Opening 180 is normally closed by door 185; and when this door is opened the coffee passes through opening 180, being conveyed toward it by the scrapers. When the level of the beans is sufficiently reduced, the scrapers fall by gravity, scrape along the bottom of the cooler and completely empty it.

In the arrangement shown in Figs. 12 and 14 there is an inner scraper 186, pivoted at 187 to support 188 which is secured to an extension 189 of sleeve 190 which surrounds shaft 175 and rotates therewith. Scraper 186 is arranged at an angle to sweep the material away from the shaft sleeve. Outermost scraper 179 is bent at 191 at an angle to sweep the material into discharge opening 180, as shown in Fig. 11. Outermost stirrer 192 is similar to stirrers 178 except that it is inclined outwardly toward the side of the cooler box and has its lower end flattened into a broad paddle 193. The number and arrangment of scrapers may be varied, and a complete set of scrapers might be attached to one rotating arm although the stirring would not be as effective and such arrangement would tend to create waves in the mass of material. For most efficient operation the arrangement shown in Figs. 11 to 15 is preferred.

The stirring mechanism is driven by an electric motor 194 having pinion 195 which meshes with gear 196 mounted on a stub shaft which also carries pinion 197. Pinion 197 meshes with gear 198 carried by shaft 199. At its opposite end shaft 199 carries beveled pinion 200 which meshes with beveled gear 201 secured to the lower end of vertical shaft 175. The electric circuit of the motor is controlled by a cam drum as hereinafter described.

Opening 180, as previously stated, is normally closed by door 185 in the form of a perforated plate, hinged at 204 to bottom 160. Beneath this door is a chute 205. The door is operated by a toggle consisting of plates 206 and 207 hinged at 208, plate 206 being hinged to door 185 at 209, and plate 207 being hinged to the frame of the cooler at 210, as shown in Fig. 18.

The toggle is controlled by a system of levers comprising arm 212 having one end rigidly attached to plate 207 and the other end fulcrumed at 213 to link 214 as shown in Figs. 11 and 18. The opposite end of link 214 is fulcrumed to crank 215 which is rigidly secured to shaft 216 journaled in brackets 217 and extending underneath the cooler as shown in Figs. 11 and 12. Shaft 216 is rotated by foot treadle 218 to open and close door 185. When door 185 is open, it rests against the inclined bottom wall of chute 205, with plates 206 and 207 folded under the door. This construction permits door 185 to be opened or closed instantly with no danger of accidental opening due to the weight of the material in the cooler or to other causes. When door is closed, plates 206 and 207 form a gate beneath the door and between the sides of chute 205 so that air can enter the suction chamber only through perforated bottom 160.

Door 185 is also operated by power cylinder 219 having power piston and piston rod 220 pivoted to lever 221 the opposite end of which is rigidly attached to shaft 216, as shown in Figs. 11 and 12. Operation of the power cylinder 219 causes shaft 216 to rotate in one direction or the other, thus opening or closing door 185 as the case may be. When foot treadle 218 is used to open the door, piston rod 220 should be disconnected from lever 221. When operating hydraulically, however, it is not necessary to disconnect the foot treadle from shaft 216.

*Hydraulic system*

All power cylinders have been referred to and identified by reference numbers in the above description. The hydraulic system for operating these power cylinders in predetermined sequence will now be described with special reference to Figures 16 to 19 inclusive.

Inasmuch as all the "single-acting" power cylinders are alike in general construction and operation, the single power cylinder and associated hydraulic tubes shown in Fig. 17 will be treated as representative of all power cylinders except the dual or "double-acting" power cylinders 29—30 and 105—106 whose construction has already been described and whose method of operation will be included in the ensuing description.

Power cylinder shown in Fig. 17 comprises cylinder 223 having cylinder heads 224 and 225 and power piston 226 secured to piston rod 227 which extends through packing gland 228 in head 224. Hydraulic tubes 229 and 230 are connected to ducts 231 and 232 in the respective cylinder heads 224 and 225. In the position shown in Fig. 17 oil or other liquid in the hydraulic system has been forced through tube 229 and duct 231 into cylinder 223, depressing piston 226 and piston rod 227. To raise piston 226 it is necessary to reverse the direction of the liquid by relieving the pressure in tube 229 and forcing the liquid through tube 230 and cylinder duct 232.

Pressure in tubes 229 and 230 is controlled by a valve which is one of a number of valves in valve chest 233. This chest has inlet chamber 234 and outlet chamber 235, and contains a plurality of open-ended valve bodies 236 each of which is provided with piston 237 having piston heads 238 connected by a reduced central shank 239. Both ends of valve body 236 open into inlet chamber 234 of the valve chest, and each valve body has a central opening 240 communicating with outlet chamber 235. Ports 241 and 242 open into valve body 236, at opposite sides of central opening 240, and these ports are connected to respective hydraulic tubes 229 and 230 by couplings 243 and 244 as shown in Fig. 17. Eleven power cylinders 29, 30, 69, 76, etc., are employed, and consequently valve chest 233 will contain eleven valve bodies 236 and pistons 237, with connections to the hydraulic tubes leading to the respective power cylinders. Each piston 237 has a piston rod extending through a packing gland 246 in the valve chest and operates in a manner hereinafter described.

Each cylinder of the "double-acting" power cylinders 29, 30 and 105, 106 is individually connected to the valve chest in exactly the same manner as all the other power cylinders.

Pressure is always exerted on the oil in inlet chamber 234. With parts in the position shown in Fig. 17, liquid will be forced through port 241, tube 229, duct 231 and into upper end of power cylinder 223, depressing piston 226, while liquid in lower portion of cylinder 223 will flow through duct 232, tube 230, port 242 and opening 240 in valve body to outlet chamber 235. When piston 237 is moved to the right in Fig. 17, left-hand piston head 238 will open port 242 to inlet chamber 234, and right-hand piston head 238 will open port 241 to outlet chamber 235. This reverses the flow of liquid in tubes 229 and 230, raising power piston 226. It is understood that the position shown in Fig. 17 is only representative; and that tube 229 may be connected to the bottom of power cylinder 223, and tube 230 may be connected to the top.

In Figs. 16 and 17 the several tubes 229 are above tubes 230 at the points where tubes enter valve chest 233, so lower tubes 230 are not visible in the plan view. All tubes are so connected to valve chest that the liquid will flow so as to move the power pistons in the proper direction to correctly operate the moving parts.

The oil or other liquid is circulated through the system by hydraulic pump 247 driven by electric motor 248, as shown in Fig. 16. This pump is connected by suction pipe 249 to oil storage tank 250, supported by brackets 251 on the roaster as shown in Fig. 2; and this pump forces the oil through pipe 252 into inlet chamber 234 of valve chest 233. Outlet chamber 235 of valve chest is connected to storage tank 250 by drain pipe 253. Pipe 252 has pressure relief valve 255 located close to the valve chest and this valve is set to maintain about 75 pounds pressure. Relief pipe 254 leads from the relief valve to the storage tank so that if the pressure rises above that at which the valve is set, the valve releases and permits liquid to pass into the storage tank until the pressure is lowered, when the relief valve closes. Branch pipe 257 connects the pressure side of the system to pressure tank 258, the purpose of which is to maintain sufficient liquid under pressure so that if the pump is overloaded, the pressure in the system will not drop. Air valve 259 is provided so that air may be pumped into the pressure tank if desired. Tank 258 has conduit 260 leading to air pressure gage 261 on front of roaster as shown in Fig. 3. Valve chest 233, pump 247 and motor 248 are all mounted on platform 262 at back of the roaster, as shown in Figs. 1 and 2. During the day's roast pump motor 248 operates continuously, being connected to power circuit by switch 263 on front of the roaster.

The valve pistons 237 are operated by a control member which comprises a cam drum 265 rotated by electric motor 266. Rotation is in the direction of the arrows in Figs. 1, and 16 to 19. The developed surface of the drum is shown in Fig. 18. The surface of drum 265 contains a plurality of raised cams, one for each piston rod in valve chest 233. These cams are numbered from 268 to 278, and their associated piston rods are correspondingly numbered from 268' to 278'. The several cams, their associated piston rods, the particular power cylinder controlled by each cam and piston, and the part operated by each power cylinder, are shown in the following table:

| Cam | Valve piston rod | Power cylinder | Operates |
| --- | --- | --- | --- |
| 268 | 268' | 30 | Gas cock 27. |
| 269 | 269' | 76 | Feed hopper gate 74. |
| 270 | 270' | 95 | Spray cock 94. |
| 271 | 271' | 29 | Gas cock 27. |
| 272 | 272' | 105 | Smoke damper 98. |
| 273 | 273' | 106 | Smoke damper 98. |
| 274 | 274' | 219 | Cooler box door 185. |
| 275 | 275' | 172 | Cooler slide 164. |
| 276 | 276' | 154 | Discharge chute 147. |
| 277 | 277' | 149 | Swing gate 143. |
| 278 | 278' | 69 | Bin gate 67. |

Additional cams operate switches for lights, bells or solenoids, as follows:

| Cam | Switch | Operates |
| --- | --- | --- |
| 280 | 282 | Cooler motor 194. |
| 281 | 283 | Bell 285 and lamp 286. |
| 287 | 288 | Lamp 289 and bell 289a. |

Mercoid switch 282 automatically controls the circuit of cooler motor 194; and this circuit can be manually controlled by switch 284 on the front of the roaster as shown in Fig. 3. Switch 284 is normally closed. When mercoid switch 282 is raised by cam 280, it starts cooler motor 194 by connecting its starter of any of the usual types to the power circuit. Switch or contact brush 283 controls the circuit of bell 285 and lamp 286, the purpose of which is to warn the operator when discharge chute 147 is about to rise. Switch or contact brush 288 controls the circuit of lamp 289 and bell 289a the purpose of which is to warn the operator to open the gas and spray cocks as hereinafter described. The mercoid switch 282 and contact brushes 283 and 288 are mounted in box 290 directly above drum 265 as shown in Fig. 16.

The outer end of each of the piston rods 268' to 278' is of rectangular cross-section as at 291, with a roller 292 journaled in it to contact with the surface of drum 265 and ride up on its aloted cam at the proper time during the rotation of the drum. The rectangular ends of the piston rods slide between rollers 293 mounted on stationary frame 290. This frame also carries a plurality of strong leaf springs 294 which contact with depending lugs 295 on the piston rods to hold the rollers 292 in yielding engagement with the cam drum. Handles 296 are secured to the piston rods to enable them to be manually operated. Handles 296 and lugs 295 are clamped against the rectangular ends 291 by nuts 297 as shown in Fig. 17.

When roasting operations are begun switch 298 on the front of the roaster is closed, drum motor 266 is connected to the power circuit and then runs continuously until the roaster and cooler are shut down. Drum 265, however, operates intermittently. Motor shaft 299 carries pinion 300 which meshes with gear 301 on shaft 302 which extends the full length of drum 265. At the opposite end from gear 306, shaft 302 carries worm 303 which meshes with worm gear 305 secured to shaft 306 the upper end of which carries worm 307. Worm 303, worm gear 305, shaft 306 and worm 307 are encased in housing 308. Worm 307 is adapted to mesh with worm gear 309 on the periphery of drum 265 beneath gear guard 310.

Upper end of housing 308 is pivoted at 309 to lever 310 which is keyed to one end of shaft 311 journaled in bearings 312 as shown in Fig. 1, this shaft extending the full length of drum 265 as shown in Fig. 16. When shaft 311 is turned in a counter-clockwise direction, as viewed in Fig. 17, lever 310 disengages worm 307 from worm gear 309 and the drum stops rotating. Conversely, when shaft 311 and lever 310 turns in a clockwise direction in Fig. 17, it causes worm 307 to engage worm gear 309 and to rotate drum 265. These movements are controlled by lever 313 keyed to shaft 311 as shown in Figs. 1, 16, and 17. One end of lever 313 is pivoted to armature 314 of solenoid 315, while the opposite end is secured to coil spring 316 which moves the lever when the solenoid is deenergized. Arm 317 is also keyed to shaft 311, and this arm has a locking detent 318 on its outer end to engage in slot 320 on the periphery of drum 265 as shown in Figs. 16 to 19.

When solenoid 315 is energized, lever 313 is depressed, moving shaft 311, arm 317 and lever 310 in a clockwise direction, causing detent 318 to withdraw from slot 320 on periphery of drum 265, and causing revolving worm 307 to engage with worm gear 309 to rotate drum 265. When solenoid 315 is deenergized, spring 316 moves shaft 311, arm 317 and lever 310 in a counter-clockwise direction, lowering detent 318 into slot 320 and pulling worm 307 out of engagement with worm gear 309; and drum stops rotating. If slot 320 has not arrived underneath locking detent 318 when the last-mentioned operation takes place, detent 318 will bear on the moving surface of drum 265 and prevent shaft 311 from turning in a counter-clockwise direction, thus maintaining worm 307 in engagement with worm gear 309, so that the drum will continue to rotate until slot 320 arrives beneath detent 318, whereupon the detent will be forced into the slot, stopping the rotation of the drum as previously described. It will thus be seen that drum 265 is idle when solenoid 315 is deenergized and locking detent 318 of arm 317 is engaged in slot 320.

The operation of solenoid 315 is controlled by thermostatic switch 322 of any suitable type, which has a pointer and contact arm 323 and is connected by tube 324 to thermometer bulb 325 inside the roaster. The bulb extends into a chute with a fixed side 326 and a movable curved side 327, attached to lower edge of spreader 10. The curved side 327 is adjusted to slightly retard the flow of beans through the chute and over thermometer bulb 325, and causes the beans to contact with all parts of the bulb. Chute side 326 is insulated with asbestos to shield the bulb from the direct heat of the flame.

Thermostatic switch 322 shown in the drawings has three separate contacts numbered 328, 329, and 330 respectively. The purpose of contact 328 is to open smoke pipe damper 98 part way when the roasting material reaches a predetermined temperature, say 390° F. The purpose of contact 329 is to turn down gas cock 27 when the roasting material reaches a predetermined temperature which may be higher or lower, say 410° F.; while the purpose of contact 330 is to operate solenoid 315 and thus case drum 265 to rotate when the material reaches the final roasting temperature of say 430° F. It is to be understood that these temperatures are mentioned for purposes of illustration and that the temperatures employed in actual practice will depend upon several different factors. The temperatures will vary for different materials, or for different blends of the same material; and will also depend upon the position of thermometer bulb 325 with respect to the flame inside the roaster. With this in mind, the operations at the several different temperatures will now be described with particular reference to Figs. 18 and 19 the latter of which shows the parts in the positions they occupy while the material is roasting but before the material reaches the assumed temperature of 390° F., and the former of which shows the positions of the parts just before drum 265 starts rotating.

It will be observed that piston rods 271' and 272' are both held in retracted position out of engagement with drum 265 in Fig. 19, even though they are not in contact with their respective cams 271 and 272. These piston rods were moved into this retracted position by cams 271 and 272 and latches 332 and 333 dropped over the fingers or handles 296 and held the piston rods back after cams 271 and 272 passed by rollers 292 on these piston rods. When the parts are in the position shown in Fig. 19 damper 98 is closed and gas cock 27 is open wide.

When thermostatic switch 322 registers the assumed temperature of 390° F. pointer 323 engages contact 328, thus energizing local relay 336 over a circuit extending from one terminal of low voltage transformer 334, through switch contacts 335 which are held closed by fibre or other insulating cam 337 of drum 265, relay 336 and lamp 336' in parallel, contact 328 and pointer 323 to the other terminal of transformer 334. Relay 336 thereupon closes contact 338 which may be a mercoid switch or any other suitable make-and-break contact, thus energizing solenoid 339 by connecting it to the power circuit. The solenoid pulls armature 340 and lifts latch 332 off handle 296 and piston rod 272' is forced against drum 265 by the action of spring 294. This reverses the direction of the liquid in power cylinder 105, slowly forcing the power piston and piston rod 107 to the left as viewed in Fig. 18, and partly opening damper 98. Lamp 336' is of distinctive color, such as blue, and indicates that the above operation has taken place.

When thermostatic switch 322 registers the assumed temperature of 410° F. pointer 323 engages contact 329, thus energizing local relay 341 over a circuit extending from one terminal of transformer 334, through switch contacts 335, relay 341 and lamp 341', contact 329 and pointer 323 to the other terminal of transformer 334. Relay 341 thereupon closes contact 342, thus energizing solenoid 343 by connecting it to the power circuit. The solenoid pulls its armature 344 and lifts latch 333 of handle 296 and piston rod 271' is forced against drum 265 by the action of spring 294. This reverses the direction of the liquid in power cylinder 29, forcing the cylinder to descend on piston rod 37 and lowering power cylinder 30, thus partly turning down gas cock 27. Solenoids 339 and 343 and associated mechanism are mounted in box 346 above piston rods 272' and 271' as shown in Fig. 16. Lamp 341' is a distinctive color, for example white.

When thermostatic switch 322 registers the desired end temperature of, say 430° F., pointer 323 engages contact 330, thus establishing an electrical circuit extending from one terminal of transformer 334, through switch contacts 335, local relay 348 and lamp 348', terminal connector 349, contact 330 and pointer 323 to the other terminal of transformer 334. Lamp 348' is a distinctive color, such as amber, and warns the operator that the roasting operation is completed and that drum 265 is about to start. Operation of relay 348 completes the energizing circuit of solenoid 315 at contact 350 of relay 348 connecting it to the power circuit, thus operating solenoid 315 and causing drum 265 to rotate as previously described.

In the particular apparatus shown in the drawings, the purpose of relay 348 is to operate solenoid 315 and start the rotation of drum 265 when the roasting material reaches the desired final temperature; but this relay may also be used to fully close gas cock 27 which was previously turned down part way by the operation of relay 341 and solenoid 343. To close the gas cock in this manner piston rod 268' is provided with a retainer and solenoid similar to retainer 333 and associated solenoid 343, and cam 268 is shortened. In the form shown in Fig. 18, roller of piston rod 268' is on surface of drum until drum 265 starts rotating at the conclusion of a roast, at which time cam 268 depresses piston rod 268' and causes gas cock 27 to be fully closed. It will thus be seen that the same result is achieved by either method of operation.

*Automatic operation*

Gas cock 27 is open wide, and smoke pipe damper 98 remains closed, during the greater part of the roasting operation; and the gas cock is partly turned down, and the damper partly opened, by thermostatic switch 322 at certain predetermined temperatures before drum 265 starts rotating.

Drum 265 starts rotating when the roasting operation is completed; and the rotating drum is then responsible for every operation of the power cylinders except the particular one-way operation of power cylinders 29 and 105 caused by the release of piston rods 271' and 272' from their retracted positions.

In tracing the cycle of automatic operations, it is assumed that piston rods 271' and 272' have been released and that the coffee or other material in roaster drum 2 has just reached the desired final shade and temperature.

Thermostatic switch 322 closes contact 330, energizing relay 348 which completes the energizing circuit of solenoid 315 as previously described. If the preferred roasting temperature is not known, the operator shifts contact 330 ahead, and then examines samples of the roasting material. When the desired shade is reached, the temperature is noted, and the operator closes a push-button or other switch 351 in shunt with pointer 323 and contact 330, thus completing the energizing circuit of local relay 348 and operating solenoid 315. The operator may set contact 330 at that observed temperature so that cam drum 265 will be started automatically at the conclusion of future roasts.

In either case, the operation of solenoid 315 starts the cam drum rotating in a clockwise direction as viewed in Figs. 1, 17, and 19, as previously described. When the drum starts rotating cam 337 releases contacts 335 which opens the energizing circuits of local relays 336, 341 and 348, preventing these relays from operating when pointer 323 of thermostatic switch 322 swings back to starting position.

As the drum rotates, various cams 268, 269, etc., will arrive in prearranged sequence under rollers 292 which will ride up on the cams and force the respective pistons to the right as viewed in Figs. 16 and 17. This movement of each individual piston reverses the direction of the fluid in its associated power cylinder. As the drum continues to rotate, each cam leaves roller 292 of its associated piston rod, whereupon spring 294 will force piston 237 to the left, as viewed in Figs. 16 and 17, and roller 292 will ride on the drum surface.

The time at which each power cylinder operates depends upon the length of its cam and its relation to the initial starting point. Figs. 16 and 18 show the general arrangement, length and relation of each of the cams to each other, but it will be understood that this arrangement is merely illustrative and is not drawn to scale. It will also be understood that the location and number of the cams may be varied, and that their position and length may be changed to vary the sequence of operations and the time periods involved.

For convenience the various operations will be numbered in the order in which they occur from the time drum 265 starts rotating:

1—Cam 268 depresses piston rod 268'; power cylinder 30 closes gas cock 27 which was previously turned down part way by cylinder 29 when the material reached 410 degrees; and gas flame goes out.

2—Cam 273 depresses piston rod 273'; power cylinder 106 moves power cylinder 105 and opens damper 98 all the way, same having previously been opened part way when the material reached 390 degrees. The wide open damper permits gas, smoke and steam to escape from the roaster through smoke pipe 97.

3—Cam 270 depresses piston rod 270'; power cylinder 95 opens spray cock 94 and water flows through spray pipe 87 to check the roasting of the material.

4—Cam 274 depresses piston rod 274'; power cylinder 219 closes door 185 in the bottom of cooler box, same having been opened to discharge the previous batch.

5—Cam 278 depresses piston rod 278'; power cylinder 69 opens gate 67 of bin 60. Green coffee passes into feed hopper 62, the position of lower end of spout 61 measuring the volume of the batch to be roasted.

6—Cam 281 engages contact brush 283, ringing bell 285 and lighting lamp 286, warning the operator that discharge chute 147 is about to swing up.

7—Cam 270 releases piston rod 270'; power cylinder 95 closes spray cock 94 and shuts off spray.

8—Cam 273 releases piston rod 273'; power cylinder 106 partly closes damper 98. At the same time, cam 272 depresses piston rod 272'; power cylinder 105 fully closes damper 98. Latch 332 now engages handle 296 of piston rod 272' and holds piston rod in retracted position after cam passes out of contact with it as shown in Figure 19.

9—Cam 278 releases piston rod 278'; power cylinder 69 closes gate 67 of bin 60.

10—Cam 275 depresses piston rod 275'; power cylinder 172 opens cooler slide 164 and allows air to be drawn through air pipe 163 connected to suction chamber of cooler box.

11—Cam 280 tilts mercoid switch 282 starting motor 194 which rotates the stirrer arms of cooler box.

12—Cam 276 depresses piston rod 276'; power cylinder 154 swings discharge chute 147 upward to connect with cooler box as shown in dotted lines in Figure 12.

13—Cam 277 depresses piston rod 277'; power cylinder 149 throws swing gate 143 inwardly, permitting roasted coffee to travel over discharge chute 147 into cooler box.

14—Cam 280 passes by mercoid switch 282, stopping motor 194 after having stirred the roasted coffee in the cooler box for a definite length of time.

15—Cam 277 releases piston rod 277'; power cylinder 149 throws swing gate 143 outwardly or in the non-discharging position shown in Figure 18.

16—Cam 269 depresses piston rod 269'; power cylinder 76 opens gate 74 of feed hopper 62 and discharges the measured batch of green coffee into the roaster.

17—Cam 271 depresses piston rod 271'; power cylinder 29 moves power cylinder 30 and partly opens gas cock 27. This starts the flow of gas which is ignited by pilot light. Latch 333 engages handle 296 of piston rod 271' and holds it in retracted position after cam 271 has passed by. At the same time cam 268 releases piston rod 268'; power cylinder 30 moves gas cock 27 to the wide open position.

18—Cam 276 releases piston rod 276'; power cylinder 154 swings discharge chute 147 down into position shown in Figure 18.

19—Cam 281 passes off brush 283; bell 285 stops ringing and lamp 286 goes out.

20—Cam 269 releases piston rod 269'; power cylinder 76 closes gate 74 of feed hopper 62.

21—Cam 275 releases piston rod 275'; power cylinder 172 closes cooler gate 164.

22—Cam 274 releases piston rod 274'; power cylinder 219 opens door 185 in the bottom of cooler box to position shown in Figure 18.

23—Second section of cam 280 tilts mercoid switch 282, operating motor 194 and rotating stirrers and scrapers which empty the cooler box.

24—Second section of cam 280 passes by mercoid switch 282 and stops motor 194 of the cooler box.

Near the end of the drum cycle, the temperature of the roasting material reaches the points at which contacts 328 and 329 effect the partial opening of damper 98 and partial closing of gas cock 27.

Cam drum stops rotating.

When contact 330 is made, the end temperature has been reached, the material has been roasted, the drum starts to rotate and the cycle begins again with Operation #1.

As soon as the gas is shut off and the spray cock 94 opens, the temperature in the roaster falls, thus causing thermostatic switch 322 to open contact 330 which de-energizes relay 348 and opens the energizing circuit of solenoid 315 at contact 350. Coil spring 316 immediately tends to pull lever 313 to the left, as viewed in Figs. 1 and 17, but by this time slot 320 on the periphery of drum 265 has passed out of range of locking detent 318, so that locking detent 318 bears on the periphery of drum 265 and prevents shaft 311 from rotating. This maintains revolving worm 307 in engagement with worm gear 309 so that the drum continues to rotate until the cycle is completed. After Operation #24 is completed, by which cooler box motor 194 stops after the material is discharged from the cooler box, slot 320 on drum 265 arrives underneath locking detent 318 which thereupon falls into the slot and stops the drum.

In the meantime, a batch of green coffee has passed into the roaster (Operation #16) and gas cock 27 has been opened (Operation #17), so that the batch starts roasting and continues to roast while the previous batch of roasted coffee is cooled and discharged from the cooler box. The roasting continues after cooler box motor 194 stops and drum 265 stops rotating; and when the fresh batch reaches the desired predetermined temperature, thermostatic switch 322 again closes contact 330 and the above time cycle begins anew, it being understood that damper 98 is partly opened and gas cock 27 partly turned down before the conclusion of the roast as previously described.

Special means are provided for stopping the mechanisms in proper sequence and at the proper time at the conclusion of the day's work; and for starting it again at any time.

*Stopping the apparatus*

The last cycle of automatic operations for the day starts with Operation #1 which shuts off the gas, and proceeds as described above until, at Operation #6, bell 285 rings and lamp 286 is lighted. This is a signal for operator to close gas cock 22 by turning hand wheel 24. Cam 86 on rod 23 is thereby turned, and locking bar 82 descends by gravity until its upper shoulder 85 rests on flat edge of cam 86 and its lower end fits inside rim of gate handle 75, thus locking feed hopper gate 75 in closed position. When Operation #7 is completed (closing spray cock 94), operator closes valve 88 in water pipe 84 by turning hand wheel 91.

Sequence of automatic operations continues. At Operation #16, however, feed hopper gate 74 will not open because it is locked in closed position by locking bar 82. At Operation #17 power cylinders 29 and 30 open gas cock 27 as usual, but gas will not be ignited as gas valve 22 is closed.

Sequence of automatic operations continues, concluding with Operation #24 which stops motor 194 of the cooler box, after which locking detent 318 enters slot 320 and stops the rotation of drum 265. It will be noted that there is no coffee in the roaster, but that feed hopper 62 is filled with a batch (automatic Operation #5) and is ready to discharge it into the roaster when operations are resumed.

Operator now opens switches 263 and 298 in a common switch box on the front of the roaster, shutting down hydraulic pump motor 248 and drum motor 266. He also opens switch 284, opening circuit of the cooler box motor 194. He also stops motor 13 of fan blower 14 in the usual manner, as well as the motor which drives the main shaft 5 of the roaster.

Starting the apparatus

To start the apparatus at the beginning of the day's roast, the operator closes switches 263 and 298, starting pump motor 243 and drum motor 266. He closes switch 284 in the energizing circuit of cooler box motor 194 which is open at mercoid switch 282. He starts motor 13 of fan blower 14 and motor which drives main shaft 5 of the roaster. He also lights pilot light 20 adjacent burner nozzle 16.

He closes switch 351 for a few seconds, which operates solenoid 315, thus lifting locking detent 318 out of slot 320, forcing revolving worm 307 into engagement with the worm gear 309 which causes the drum 265 to rotate.

The automatic mechanism now goes through the sequence of operations, as follows:

1—Power cylinder 30 partly closes gas cock 27. Gas cock 27 does not close all the way because piston rod 271' is held in retracted position by latch 333.

2—Power cylinder 106 opens damper 98.

3—Power cylinder 95 opens spray cock 94. Spraying will not take place as manually-operated valve 88 is closed.

4—Power cylinder 219 closes door 185 in bottom of cooler box.

5—Power cylinder 69 opens gate 67 of bin 60, although no additional material will pass into feed hopper 62 because latter is already filled.

6—Cam 281 engages contact brush 283, ringing bell 285 and lighting lamp 286, warning the operator that discharge chute 147 is about to swing up.

7—Power cylinder 95 closes spray cock 94.

8—Power cylinders 106 and 105 operate, fully closing damper 98.

The first roast has not yet started since there is no material in the roaster; and manually-operated gas cock 22 and spray cock 88 are still closed. Cam 287 now engages contact brush 288, completing the circuit of lamp 289 and bell 289a from one terminal of low voltage transformer 334, through contact 353, contact arm 354 on rod 89 of hand wheel 91, lamp 289 and bell 289a, brush 288, cam 287 to the other terminal of transformer 334; as well as through a parallel circuit extending through arm 355 on rod 23 of hand wheel 24, and contact 356, as shown in Fig. 19; it being understood that these contacts are closed when spray cock 88 and gas cock 22 are closed.

This is a signal for the operator to open the manually-operated gas and spray cocks 22 and 88 by hand wheels 24 and 91, respectively. If only one of these cocks is opened bell 289a will continue to ring and lamp 289 will remain lighted. The bell will stop and the lamp will go out only when both the parallel circuits are broken. As piston rod 271' is held in retracted position, gas cock 27 is partly open and gas burner lights. In opening gas cock 22 control rod 23 turns in the direction of arrow in Fig. 19, causing roller cam 128 to close push-button switch 126 which starts fan motor 125. This control rod 23 also turns cam 86 to position shown in Fig. 8, raising locking bar 82 out of engagement with handle 75 of feed hopper gate 74. The sequence of automatic operation now continues as follows:

9—Power cylinder 69 closes gate 67 of bin 60.

10—Power cylinder 172 opens slide 164.

11—Cam 280 tilts mercoid switch 282, operating motor 194.

12—Power cylinder 154 swings discharge chute 147 upward.

13—Power cylinder 149 throws swing gate 143 inward.

14—Mercoid switch 282 tilts, stopping motor 194.

15—Power cylinder 149 throws swing gate 143 outward.

16—Power cylinder 76 opens gate 74 of feed hopper 62, passing the batch of green coffee into roaster. As burner was lighted when gas cock 22 was opened by hand, the actual roasting of the first batch now begins.

With the next operation (#17 in the table) power cylinder 30 opens gas cock 27 wide. From this point on, the sequence of operations is the same as previously described, drum 265 coming to a stop after the first revolution, and starting again when the thermostatic switch 322 closes contact 330, the coffee having reached the desired end temperature.

Modifications

In Fig. 21 the cooler box is mounted on truck 357 having wheels 358 which travel on rails 359 extending from the front of the roaster to a floor hopper to receive the roasted coffee after cooling. The cooler is moved away from the roaster while the material is being cooled by the suction, then emptied and brought back to the roaster for another charge.

Suction chamber 360 extends through the side of the cooler and ends in an enlarged upturned pipe 361 shaped to engage ball tube 362 which is attached to an upwardly extending pipe 363. The pipe 363 telescopes within another pipe 364 which is coupled to suction main 365 by means of ball-and-socket joint 366. This telescoping connection is similar to that disclosed in Patent #1,218,997 to R. A. Greene, issued March 13, 1917, and permits the cooler box to be moved freely between the roaster and the discharge point without disconnecting it from the suction main or interrupting the cooling operation. The suction is controlled by slide 164 previously described.

Movement of the cooler box is controlled by power cylinder 367 which is secured to stationary bracket 369 and is provided with power piston and piston rod 368 having its outer end secured to the cooler box. This power cylinder is controlled by any suitable cam on drum 265, as previously described; and in fact may be operated by cam 276 in place of the usual discharge chute 147 which may be dispensed with in the construction shown in Fig. 21. By such arrangement the cooler car may be moved up to the roaster at the time the discharge chute 147 would ordinarily be raised, receive the charge of roasted material from the roaster discharge spout 145, and moved away from the roaster at the time the discharge chute 147 would ordinarily be lowered. In other respects the construction and operation of this cooler may be the same as previously described.

In the construction shown in Fig. 21 one end of a large auxiliary exhaust pipe 371 communicates with opening 372 in the roaster; and the other end is connected at 373 to the suction main 365, or to an exhaust fan of sufficient capacity. Smoke pipe 371 has pivoted damper 374 secured to operating lever 375, and this damper is controlled by power cylinder 376 having power piston and piston rod 377 pivoted to lever 375. Damper 374 is kept fully closed during the roast, and is opened only at the conclusion of the roast to permit the escape of the large volume of smoke, steam, etc. produced at this time. Part of this smoke and steam will still escape through smoke pipe 97, which is used the same as before, but auxiliary smoke pipe 371, which is of large capacity, permits the use of a smaller smoke pipe 97, and smaller fan motor; and enables damper 98 of smoke pipe 97 to be adjusted more accurately for two-stage or even three-stage operation during the progress of the roast. Power cylinder 376 is controlled by cam drum 265 in the manner previously described.

It is important to regulate accurately the amount of water sprayed upon the material at the conclusion of the roast. In Fig. 21 this is accomplished by means of a measuring tank 379 set at a definite distance above the roaster, having discharge pipe 380 connected at 381 to water pipe 84. Tank 379 is filled in a well-known manner, under control of a float 382. Float is provided with pointer 383 which indicates the water level on scale 384 secured to and depending from tank 379. Spray cock 94 and other mechanisms are operated, either manually or automatically, exactly as before, the function of tank 379 and associated parts being to supply an accurately measured volume of water at a definite head or pressure to spray pipe 87 at the conclusion of each roast regardless of fluctuations in the water pressure in any given locality.

We have described various signals to indicate that certain movements are completed or about to take place, and additional signals may be employed if desired. In Fig. 19 we show lamp 386 which is lighted when feed hopper 62 is full. This lamp is operated by mercoid switch 387 controlled by lever 388 which is pivoted to inclined plate 389. This plate is pivoted at 390 to stationary side plates 391 which are mounted on the inner wall of the hopper and have tent-shaped hood 392. The green coffee pours over hood 392, and, when the hopper is full, the coffee fills the space between stationary plates 391 and depresses pivoted plate 388. This tilts mercoid switch 387 and lights lamp 386. Hood 392 prevents the descending stream of coffee from depressing plate 388 until the level of the coffee is above the hood.

Fig. 22 shows means for preventing commencement of the roasting operation when feed hopper 62 does not contain a batch of green coffee. In the machine described above, if feed hopper 62 does not contain a batch of green coffee when drum 265 starts rotating, drum 265 will open gate 74 and the gas burner will be lighted as previously explained. In such a situation the roaster cylinder would be empty and the high temperature would affect thermometer 325 and might even cause damage to the apparatus. This is prevented by the mechanism shown in Fig. 22 which stops the rotation of drum 265 when feed hopper 62 is empty, just before cam 269 would ordinarily open gate 74 on the bottom of the feed hopper.

In Fig. 22 drum 265 has an additional slot 394 which is located to receive locking detent 318 just before cam 269 depresses valve piston rod 269' to open feed hopper gate 74. The drum also has an auxiliary cam 395 of insulating material adapted to close contacts 396 in series with relay 348 and second mercoid switch 397 controlled by lever 388 of the bin signal mechanism. When a batch of green coffee is in feed hopper 62 lamp 386 will be lighted and mercoid switches 387 and 397 will both be tilted. As drum 265 revolves, cam 395 at the proper point will close contacts 396, energizing relay 348 over a circuit extending from one terminal of second low voltage transformer 398, through mercoid switch 397, knife switch 399 which is closed as shown in full lines in Fig. 22, contacts 396, winding of relay 348, to the other terminal of transformer 398. Relay 348 operates solenoid 315, preventing locking detent 318 from falling into slot 394 and thus permitting drum 265 to continue rotating. However, if there is no coffee in feed hopper 62 at this time mercoid switches 387 and 397 will not tilt, relay 348 will remain deenergized, and locking detent 318 will fall into slot 394. The drum will therefore stop at this point and all operations will cease. The operator in charge of the roasting room will immediately know, due to the discontinuance of operations, that something has happened and will see that signal lamp 386 is not lighted. He will then pass green coffee into feed hopper 62 and as soon as lamp 386 lights, due to the tipping of mercoid switch 387, current will pass through mercoid switch 397, contact 396 and relay 348, operating solenoid 315 thus starting rotation of drum 265 and the roasting will progress in regular order.

Fig. 22 also shows means for operating two or more roasters in a battery on a time schedule. If individual automatic operation goes on in a plant having several machines, due to slight variations in the coffee or in the gas pressure, etc., several machines might discharge coffee at the same time. This requires cooling several batches simultaneously and is apt to slow down the cooling. For this and other reasons we prefer in operating a battery of roasters to have the roasters start their roasting operations in staggered relation. For example, if a plant has four roasters, the second machine could start up four minutes after the first machine, the third machine eight minutes after the first machine, and the fourth machine twelve minutes after the first. This time schedule is merely illustrative as any other suitable timing may be employed.

In order to accomplish this we provide a small master control drum 400 having a plurality of cams 401, 402, 403 and 404. In Fig. 22 it is assumed that there are four roasters in the battery and hence drum 400 has four cams, one cam being allotted to each roaster. These cams are preferably made of insulating material, and each cam controls a pair of electrical contacts 401', 402', 403' or 404', as the case may be. Each pair of contacts is adapted to be connected in series with relay 348 and mercoid switch 397 of the particular roaster which said contacts are intended to control, and may be so connected by moving knife switch 399 to the dotted line position in Fig. 22. All of the mechanisms shown in Fig. 22, except master control drum 400, belong to one roaster which will be assumed to be roaster #1 and hence are connected to contacts 401' of drum 400; it being understood that the remaining contacts 402', etc. are similarly connected to the control circuits of their respective roasters.

Drum 400 is rotated by shaft 405 having gear 406 which meshes with gear 407 of the drum. The speed of drum 400 is what determines the time at which the several roasters start up, and this speed may be varied merely by changing gears 406 and 407. Shaft 405 may be rotated continuously by any suitable source of power, and in fact gear 406 may be connected to motor shaft 299 of roaster #1. Drum 400 rotates in the direction of the arrow in Fig. 22 and the various cams 401, etc. close contacts 401' etc. at definite time intervals depending upon the speed of rotation of drum 400. When cam 401 closes contacts 401', for example, relay 348 is operated over a circuit extending from one terminal of transformer 398, through mercoid switch 397, knife switch 399 which is closed as shown in dotted lines, master drum contacts 401', knife switch 399, contacts 396, winding of relay 348, to the other terminal of transformer 398. Relay 348 operates solenoid 315 of roaster #1, lifting locking detent 318 out of slot 394. Two conditions must therefore be fulfilled in order that the cam drum 265 of each of the roasters will start up. First, there must be a charge of coffee in roaster feed hopper 62 in order to tilt mercoid switch 397 and, secondly, the cam such as 401 of master control drum 400 must be in position to close the electrical circuit through its contacts such as 401', as described above. By properly spacing the cams on master control drum 400 the start of each of the roasters will be definitely determined and, as previously described, by changing gears 406 and 407 any definite time interval may be obtained.

An alternative method of controlling the spacing of the roasts of the several machines in the unit can be obtained by connecting master control drum 400 to worm 307, or directly to cam drum 265 of one roaster so that it runs only when the cam drum of the control roaster is revolving. The cams and switches on drum 400 would then operate in exactly the same manner as previously described. It is necessary to insure that the control roaster, to which drum 400 is attached, is the slowest roasting machine in the unit and this is easily effected by regulating the gas; and it is necessary to set the cams on drum 400 so that all the roasters in the unit start roasting in the interval elapsing between the lifting of detent 318 from slot 394 and the dropping of this detent into slot 320 when cam drum 265 stops.

It will be evident that all the operations described herein may be performed or controlled by hand, from the time the material enters the feed hopper 62 until the roasted material is discharged from the cooler box in a cooled state. The method of disconnecting the piston rods of the various power cylinders, and operating all the parts by hand, has been described above.

All automatic operations may be performed by electric switches under control of drum 265, but we prefer the hydraulic system because it is quiet, more economical in that it uses less power, it is positive, any mechanical operation can be performed at any desired speed by the proper use of needle valves, and any desired mechanical movement may be obtained by varying the length of the power cylinder.

It will also be evident that various other changes may be made in the details of construction and method of operation herein described, without departing from the scope and spirit of the invention as defined in the appended claims.

The invention claimed is:

1. An automatic roaster having a fuel supply pipe, a fuel cock controlling the flow of fuel in said pipe, a water pipe for spraying the roasted material, a spray cock controlling the flow of water in said water pipe, a smoke pipe having a damper, a plurality of movable parts for operating said fuel cock, said spray cock and said damper, a control member operable in definite time cycles, means operated by said control member for operating said movable parts in predetermined sequence during a time cycle, a thermostat responsive to changes in the temperature of the roasting material, means operated by said thermostat for partly opening said damper at a given temperature, means operated by said thermostat for partly closing said fuel cock at a given temperature, means operated by said thermostat for operating said control member at a higher temperature marking the conclusion of a roast, and means for stopping the operation of said control member at the conclusion of a time cycle.

2. An automatic roaster having a plurality of movable parts for discharging roasted material and for supplying measured amounts of fresh material to the roaster, a fuel supply pipe, a fuel cock controlling the flow of fuel in said pipe, a water pipe for spraying the roasted material, a spray cock controlling the flow of water in said water pipe, a smoke pipe having a damper, a thermostat responsive to changes in the temperature of the roasting material, means operated by said thermostat for partly opening said damper at a given temperature, means operated by said thermostat for partly closing said fuel cock at a given temperature, a control member operable in definite time cycles, means operated by said thermostat for operating said control member and for fully closing said fuel cock at a temperature marking the conclusion of a roast, and means operated by said control member for operating said movable parts and said spray cock and for opening said fuel cock and closing said damper all in predetermined sequence during a time cycle.

3. An automatic roaster having a plurality of movable parts for discharging roasted material and for supplying measured amounts of fresh material to the roaster, a rotatable member having means for operating said movable parts in predetermined sequence, a gear on said rotatable member, a revolving worm adapted to engage said gear to rotate said member, means for holding said worm out of engagement with said gear, and means controlled by the temperature of the roasted material for engaging said worm with said gear.

4. An automatic roaster having a plurality of movable parts for discharging roasted material and for supplying measured amounts of fresh material to the roaster, a rotatable member having means for operating said movable parts in predetermined sequence, a gear on said rotatable member, a revolving worm adapted to engage said gear to rotate said member, means for engaging said worm with said gear, and means operated at the conclusion of a complete cycle of operations for disengaging said worm from said gear.

5. An automatic roaster having a plurality of movable parts for discharging roasted material and for supplying measured amounts of fresh material to the roaster, a rotatable member having means for operating said movable parts in predetermined sequence, a gear on said rotatable member, a revolving worm adapted to engage said gear to rotate said member, means controlled by the temperature of the roasted material for moving said worm into engagement with said gear, means operative upon the rotation of said member to hold said worm in engagement with said gear during a complete cycle of operations, and means operative upon the completion of said cycle to move said worm out of engagement with said gear.

6. An automatic roaster having a plurality of movable parts for discharging roasted material and for supplying measured amounts of fresh material to the roaster, a rotatable member having means for operating said movable parts in predetermined sequence, a gear on said rotatable member, a revolving worm adapted to engage said gear to rotate said member, a pivoted lever controlling the movement of said worm into and out of engagement with said gear, means for pivoting said lever in one direction to move said worm into engagement with said gear, and means controlled by said rotatable member and operable upon the completion of its cycle to pivot said lever in the other direction to move said worm out of engagement with said gear.

7. An automatic roaster having a smoke pipe leading to the outside air, a damper in said smoke pipe, a suction main, a second smoke pipe connected between said suction main and said roaster, a damper in said second smoke pipe, a thermostat responsive to change in the temperature of the roasting material, means controlled by said thermostat for operating the damper in the first-mentioned smoke pipe to regulate the draft during the roast, and means controlled by said thermostat for opening the damper in the second smoke pipe at the conclusion of the roast.

8. A hydraulically operated roaster having means for heating the material to be roasted and having a plurality of movable parts operated by power cylinders supplied with liquid from a pressure source, a plurality of valves having pistons controlling the flow of pressure liquid to the respective power cylinders, a rotatable member having a plurality of cams for operating said pistons in predetermined sequence to move said parts through a timed cycle of operations, a gear on said rotatable member, a revolving worm adapted to engage said gear to rotate said member, means controlled by the temperature of the roasted material for moving said worm into engagement with said gear, means operative upon the rotation of said member to hold said worm in engagement with said gear during a complete cycle of said movable parts, and means operative upon the completion of said cycle to move said worm out of engagement with said gear.

9. A hydraulically operated roaster having means for heating the material to be roasted and having a plurality of movable parts operated by power cylinders supplied with liquid from a pressure source, a plurality of valves having pistons controlling the flow of pressure liquid to the respective power cylinders, a rotatable member having a plurality of cams for operating said pistons in predetermined sequence to move said parts through a timed cycle of operations, a gear on said rotatable member, a revolving worm adapted to engage said gear to rotate said member, a pivoted lever controlling the movement of said worm into and out of engagement with said gear, means for pivoting said lever in one direction to move said worm into engagement with said gear, and means controlled by said rotatable member and operable upon the completion of a cycle of said movable parts to pivot said lever in the other direction to move said worm out of engagement with said gear.

10. A hydraulically operated roaster having a plurality of movable parts for discharging roasted material and for supplying measured amounts of fresh material to the roaster, a fuel supply pipe, a fuel cock controlling the flow of fuel in said pipe, a smoke pipe having a damper, a plurality of movable parts for operating said fuel cock and said damper, a plurality of power cylinders supplied with liquid from a pressure source and having means for operating said movable parts, a plurality of valves having pistons controlling the flow of pressure liquid to the respective power cylinders, a thermostat responsive to changes in the temperature of the roasting material, means operated by said thermostat for partly opening said damper at a given temperature, means operated by said thermostat for partly closing said fuel cock at a given temperature, a rotatable member having a plurality of cams for operating said pistons in predetermined sequence to move said parts through a timed cycle of operations, and means operated by said thermostat for operating said rotatable member at a temperature marking the conclusion of a roast.

11. A hydraulically operated roaster having a plurality of movable parts for discharging roasted material and for supplying measured amounts of fresh material to the roaster, a fuel supply pipe, a fuel cock controlling the flow of fuel in said pipe, a smoke pipe having a damper, a plurality of power cylinders supplied with liquid from a pressure source and having means for operating said movable parts, a plurality of double power cylinders supplied with liquid from said pressure source and having means for closing said fuel cock and opening said damper in a plurality of stages, a plurality of valves having pistons and associated piston rods controlling the flow of pressure liquid to the respective power cylinders, a rotatable member arranged to rotate in contact with said piston rods and having a plurality of raised cams for depressing said piston rods and associated pistons in predetermined sequence to move said parts through a timed cycle of operations, means for urging said piston rods into yielding engagement with said rotatable member, movable retainers associated with certain of the piston rods controlling the operation of said fuel cock and said damper and having means for engaging said piston rods and holding same in depressed position when out of contact with the associated cams, means controlled by the temperature of the roasting material for operating said retainers and releasing the associated piston rods to partly close said gas cock and partly open said damper during a roast, means for operating said rotatable member at the conclusion of a roast, and means controlled by said rotatable member for stopping its own rotation at the end of a complete cycle of operations.

12. In a roaster, a smoke pipe, a fan connected to said smoke pipe, an electric motor for operating said fan, an energizing circuit including a push button switch for controlling said motor, a gas cock controlling the supply of gas to the roaster, a rotatable rod for operating said gas cock, and a cam on said rod adjacent said switch in position to depress said push button and close the switch when the gas cock is opened.

13. In a roaster, a smoke pipe, a fan connected to said smoke pipe, an electric motor for operating said fan, an energizing circuit including a push button switch for controlling said motor, a gas cock controlling the supply of gas to the roaster, a rotatable rod for operating said gas cock, a cam on said rod adjacent said switch in position to depress said push button and close said switch when the gas cock is opened, a second push button switch in said energizing circuit in parallel to the first mentioned switch, a pivoted lever for depressing the push button and closing the second switch, and means for locking said lever in its operated position.

14. In a roaster, the combination of a roasting drum, a conduit for supplying material to said drum, a gate for opening and closing said conduit, a fuel supply pipe communicating with said drum to heat the contents, a valve in said pipe, a handle for opening and closing said valve, and means controlled by said handle for locking said gate when closed.

15. In a roaster; the combination of a roasting drum, a feed hopper for supplying material to said drum, a gate on the bottom of said feed hopper, a fuel supply pipe communicating with said drum to heat the contents, a valve in said supply pipe, a rotatable rod for opening and closing said valve, a movable locking bar adapted to engage and lock said feed hopper gate when closed, and means controlled by said rod for moving said locking bar into and out of engagement with said feed hopper gate.

16. In a roaster, the combination of a roasting drum, a feed hopper for supplying material to said drum, a sliding gate on the bottom of said feed hopper, a fuel supply pipe communicating with said drum to heat the contents, a valve in said supply pipe, a rotatable rod for opening and closing said valve, a movable locking bar adapted to engage and lock said feed hopper gate when closed, and a cam on said rod shaped to hold said locking bar out of engagement with said feed hopper gate in the open position of said valve.

17. In a roaster, the combination of a roasting drum, a feed hopper for supplying material to said drum, a horizontal sliding gate on the bottom of said feed hopper, a fuel supply pipe communicating with said drum to heat the contents, a valve in said supply pipe, a horizontal rotatable rod for opening and closing said valve, a slidable locking bar having a shoulder overlying said rod and a vertical stem adapted to descend by gravity into locking engagement with said feed hopper gate when closed, and a cam on said rod contacting with said shoulder and arranged to hold said locking bar out of engagement with said feed hopper gate in the open position of said valve.

18. In a hydraulically operated roaster, the combination of a roasting drum, a feed hopper for supplying material to said drum, a gate on the bottom of said feed hopper, a fuel supply pipe communicating with said drum to heat the contents, a valve in said fuel supply pipe, power cylinders and pistons for opening and closing said feed hopper gate and said valve, means including a rotatable cam member for operating said power cylinders, means including a thermostatic switch responsive to the temperature of the roasted material to rotate said cam member, a second valve in said fuel supply pipe, and means for simultaneously closing said second valve and locking said feed hopper gate in closed position.

19. In a hydraulically operated roaster, the combination of a roasting drum, a feed hopper for supplying material to said drum, a gate on the bottom of said feed hopper, a fuel supply pipe communicating with said drum to heat the contents, a valve in said fuel supply pipe, power cylinders and pistons for opening and closing said feed hopper gate and said valve, means including a rotatable cam member for operating said power cylinders, means including a thermostatic switch responsive to the temperature of the roasted material to rotate said cam member, a second valve in said fuel supply pipe, a rotatable rod for opening and closing said second valve, a movable locking bar adapted to engage and lock said feed hopper gate when closed, and means controlled by said rod to hold said locking bar out of engagement with said feed hopper gate in the open position of said second valve.

20. An automatic roaster having a plurality of movable parts for discharging roasted material and for supplying measured amounts of fresh material to the roaster, a fuel supply pipe, a fuel cock controlling the flow of fuel in said pipe, a smoke pipe having a damper, a thermostat responsive to changes in the temperature of the roasting material, means operated by said thermostat for partly opening said damper at a given temperature, means operated by said thermostat for partly closing said fuel cock at a given temperature, a control member operable in definite time cycles, means operated by said thermostat for operating said control member and for fully closing said fuel cock at a temperature marking the conclusion of a roast, means operated by said control member for operating said movable parts and for opening said fuel cock and closing said damper in predetermined sequence during a time cycle, signaling means actuated by said thermostat to indicate operations at given temperatures, and signaling means actuated by said control member to indicate operations during the time cycle.

WILLIAM G. BURNS.
RICHARD A. GREENE.